(12) United States Patent
Lee et al.

(10) Patent No.: US 11,599,284 B2
(45) Date of Patent: Mar. 7, 2023

(54) STORAGE CONTROLLER, STORAGE SYSTEM AND OPERATING METHODS THEREOF

(71) Applicant: Samsung Electronics Co., Ltd., Suwon-si (KR)

(72) Inventors: Young Min Lee, Seoul (KR); Soong-Mann Shin, Hwaseong-si (KR); Kyung Phil Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/331,123

(22) Filed: May 26, 2021

(65) Prior Publication Data

US 2022/0114117 A1 Apr. 14, 2022

(30) Foreign Application Priority Data

Oct. 8, 2020 (KR) .................. 10-2020-0130267

(51) Int. Cl.
*G06F 3/06* (2006.01)
*G06F 1/26* (2006.01)
*G06F 13/16* (2006.01)
*G06F 12/02* (2006.01)

(52) U.S. Cl.
CPC .............. *G06F 3/0635* (2013.01); *G06F 1/26* (2013.01); *G06F 3/0653* (2013.01); *G06F 3/0688* (2013.01); *G06F 12/0246* (2013.01); *G06F 13/1668* (2013.01); *G06F 2212/7206* (2013.01)

(58) Field of Classification Search
CPC .... G06F 3/0635; G06F 3/0653; G06F 3/0688; G06F 1/26; G06F 12/0246; G06F 13/1668; G06F 2212/7206; G06F 2212/7204
See application file for complete search history.

(56) References Cited

U.S. PATENT DOCUMENTS

| 8,621,128 B2 | 12/2013 | Radulescu et al. |
| 9,152,596 B2 | 10/2015 | Wagh et al. |
| 10,452,122 B2 | 10/2019 | Shih et al. |

(Continued)

FOREIGN PATENT DOCUMENTS

| KR | 10-0290657 B1 | 5/2001 |
| KR | 10-0780803 B1 | 11/2007 |
| KR | 10-2015-0012518 A | 2/2015 |

OTHER PUBLICATIONS

JEDEC Standard Universal Flash Storage (UFS 1.1); JEDEC Solid State Technology Association; pp. i-vii and 340-386; Jun. 2012. (Year: 2012).*

(Continued)

*Primary Examiner* — Glenn A. Auve
(74) *Attorney, Agent, or Firm* — Muir Patent Law, PLLC

(57) ABSTRACT

A storage system is provided. The storage system includes a storage device including a plurality of nonvolatile memories configured to transmit storage throughput information, and a host device configured to change connection configurations for the storage device based on the storage throughput information, wherein the host device changes the connection configurations by changing configurations for transmitter and receiver paths between the storage device and the host device independently.

19 Claims, 18 Drawing Sheets

(56) References Cited

U.S. PATENT DOCUMENTS

| | | | |
|---|---|---|---|
| 2015/0032913 A1* | 1/2015 | Kim | G06F 13/4291 |
| | | | 710/24 |
| 2016/0283434 A1* | 9/2016 | Ranganathan | G06F 13/387 |
| 2018/0059954 A1 | 3/2018 | Hur et al. | |
| 2018/0157417 A1* | 6/2018 | Shih | G06F 3/0625 |
| 2018/0203632 A1 | 7/2018 | Shih et al. | |
| 2018/0275892 A1* | 9/2018 | Shih | G06F 13/4068 |
| 2019/0013079 A1 | 1/2019 | Blodgett et al. | |
| 2019/0121542 A1 | 4/2019 | Brennan et al. | |
| 2020/0036453 A1 | 1/2020 | Rajadurai et al. | |
| 2020/0341825 A1* | 10/2020 | Sudarmani | G06F 9/4418 |

OTHER PUBLICATIONS

European Search Report dated Jan. 5, 2022 for corresponding application EP 21 181 962.8.
First Office Action dated Jan. 11, 2022 for corresponding application EP 21 181 962.8.

* cited by examiner

FIG. 5

| Offset | Size | Name | Value | Description | |
|---|---|---|---|---|---|
| 57h | 1 | bRecommendRxLevel | Device specific | Level 1 | Setting of HS-G1A-1Lane or more needed |
| | | | | Level 2 | Setting of HS-G1B-1Lane or more needed |
| | | | | Level 3 | Setting of HS-G1A-2Lane or more needed |
| | | | | Level 4 | Setting of HS-G1B-2Lane or more needed |
| | | | | Level 5 | Setting of HS-G2A-1Lane or more needed |
| | | | | Level 6 | Setting of HS-G2B-1Lane or more needed |
| | | | | Level 7 | Setting of HS-G2A-2Lane or more needed |
| | | | | Level 8 | Setting of HS-G2B-2Lane or more needed |
| | | | | Level 9 | Setting of HS-G3A-1Lane or more needed |
| | | | | Level 10 | Setting of HS-G3B-1Lane or more needed |
| | | | | Level 11 | Setting of HS-G3A-2Lane or more needed |
| | | | | Level 12 | Setting of HS-G3B-2Lane or more needed |
| | | | | Level 13 | Setting of HS-G4A-1Lane or more needed |
| | | | | Level 14 | Setting of HS-G4B-1Lane or more needed |
| | | | | Level 15 | Setting of HS-G4A-2Lane or more needed |
| | | | | Level 16 | Setting of HS-G4B-2Lane or more needed |
| | | | | Level 17 | Setting of HS-G5A-1Lane or more needed |
| | | | | Level 18 | Setting of HS-G5B-1Lane or more needed |
| | | | | Level 19 | Setting of HS-G5A-2Lane or more needed |
| | | | | Level 20 | Setting of HS-G5B-2Lane or more needed |

| Offset | Size | Name | Value | Description | |
|--------|------|------|-------|----------|---|
| 58h | 1 | bRecommendTxLevel | Device specific | Level 1 | Setting of HS-G1A-1Lane or more needed |
| | | | | Level 2 | Setting of HS-G1B-1Lane or more needed |
| | | | | Level 3 | Setting of HS-G1A-2Lane or more needed |
| | | | | Level 4 | Setting of HS-G1B-2Lane or more needed |
| | | | | Level 5 | Setting of HS-G2A-1Lane or more needed |
| | | | | Level 6 | Setting of HS-G2B-1Lane or more needed |
| | | | | Level 7 | Setting of HS-G2A-2Lane or more needed |
| | | | | Level 8 | Setting of HS-G2B-2Lane or more needed |
| | | | | Level 9 | Setting of HS-G3A-1Lane or more needed |
| | | | | Level 10 | Setting of HS-G3B-1Lane or more needed |
| | | | | Level 11 | Setting of HS-G3A-2Lane or more needed |
| | | | | Level 12 | Setting of HS-G3B-2Lane or more needed |
| | | | | Level 13 | Setting of HS-G4A-1Lane or more needed |
| | | | | Level 14 | Setting of HS-G4B-1Lane or more needed |
| | | | | Level 15 | Setting of HS-G4A-2Lane or more needed |
| | | | | Level 16 | Setting of HS-G4B-2Lane or more needed |
| | | | | Level 17 | Setting of HS-G5A-1Lane or more needed |
| | | | | Level 18 | Setting of HS-G5B-1Lane or more needed |
| | | | | Level 19 | Setting of HS-G5A-2Lane or more needed |
| | | | | Level 20 | Setting of HS-G5B-2Lane or more needed |

☐ No need to set the unchanged values

FIG. 11

| HS-GEAR | Rate A-series | Rate B-series | Lane |
|---|---|---|---|
| HS-GEAR1 | 1248 bps | 1459.2 bps | 1 or 2 |
| HS-GEAR2 | 2496 bps | 2918.4 bps | 1 or 2 |
| HS-GEAR3 | 4992 bps | 5836.8 bps | 1 or 2 |
| HS-GEAR4 | 9984 bps | 11673.6 bps | 1 or 2 |
| HS-GEAR5 | 19968 bps | 23347.2 bps | 1 or 2 |

FIG. 12

| bRecommendRxLevel bRecommendTxLevel | Description |
|---|---|
| 0x1 | (HS-GEAR1, Rate A-series, 1lane) more |
| 0x2 | (HS-GEAR1, Rate A-series, 1lane) more |
| 0x3 | (HS-GEAR1, Rate A-series, 2lane) or (HS-GEAR2, Rate A-series, 1lane) more |
| 0x4 | (HS-GEAR1, Rate B-series, 2lane) or (HS-GEAR2, Rate B-series, 1lane) more |
| 0x5 | (HS-GEAR2, Rate A-series, 1lane) more |
| 0x6 | (HS-GEAR2, Rate B-series, 1lane) more |
| 0x7 | (HS-GEAR2, Rate A-series, 2lane) or (HS-GEAR3, Rate A-series, 1lane) more |
| 0x8 | (HS-GEAR2, Rate B-series, 1lane) more (HS-GEAR3, Rate B-series, 1lane) more |
| 0x9 | (HS-GEAR3, Rate A-series, 1lane) more |
| 0xA | (HS-GEAR3, Rate B-series, 1lane) more |
| 0xB | (HS-GEAR3, Rate A-series, 2lane) or (HS-GEAR4, Rate A-series, 1lane) more |
| 0xC | (HS-GEAR3, Rate B-series, 1lane) more (HS-GEAR4, Rate B-series, 1lane) more |
| 0xD | (HS-GEAR4, Rate A-series, 1lane) more |
| 0xE | (HS-GEAR4, Rate B-series, 1lane) more |
| 0xF | (HS-GEAR4, Rate A-series, 2lane) or (HS-GEAR5, Rate A-series, 1lane) more |
| 0x10 | (HS-GEAR4, Rate B-series, 1lane) more (HS-GEAR5, Rate B-series, 1lane) more |
| 0x11 | (HS-GEAR5, Rate A-series, 1lane) more |
| 0x12 | (HS-GEAR5, Rate B-series, 1lane) more |
| 0x13 | (HS-GEAR5, Rate A-series, 2lane) more |
| 0x14 | (HS-GEAR5, Rate B-series, 2lane) more |

STORAGE CONTROLLER, STORAGE SYSTEM AND OPERATING METHODS THEREOF

CROSS-REFERENCE TO RELATED APPLICATION

This application claims priority under 35 U.S.C. § 119, and all the benefits accruing therefrom, to Korean Patent Application No. 10-2020-0130267, filed on Oct. 8, 2020, the disclosure of which is incorporated herein by reference in its entirety.

BACKGROUND

1. Field

The present disclosure relates to a storage system including a storage controller.

2. Description of the Related Art

Semiconductor memories are used to store data with the use of semiconductor elements. A volatile memory device is a memory device that only maintains its data while being powered. Examples of volatile memory devices include a static random-access memory (SRAM), a dynamic random-access memory (DRAM) and a synchronous DRAM (SDRAM). A nonvolatile memory (NVM) device is a memory device that can retain its data even when power is cut off. Examples of NVM devices include a read-only memory (ROM), a programmable ROM (PROM), an electrically programmable ROM (EPROM), an electrically erasable and programmable ROM (EEPROM), a flash memory, a phase-change random-access memory (PRAM), a magnetic random-access memory (MRAM), a resistive random-access memory (RRAM) and ferroelectric random-access memory (FRAM).

In a memory device, read and write delays are different, and read and write throughputs are also different. A receiver (Rx) path via which data is transmitted for a write operation and a transmitter (Tx) path via which data is transmitted for a read operation have different throughputs for various reasons, but as a typical host device cannot identify the internal state of the memory device, only default settings are generally used to connect the host device and the memory device.

SUMMARY

Embodiments of the present disclosure provide a storage controller which is connected to a host device by reflecting the internal state of a memory device.

Embodiments of the present disclosure provide a storage system which is connected to a host device based on the internal state of a memory device.

Embodiments of the present disclosure also provide an operating method of a storage controller which is connected to a host device based on the internal state of a memory device.

Embodiments of the present disclosure also provide an operating method of a storage system which is connected to a host device based on the internal state of a memory device.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a storage system includes a storage device including a plurality of nonvolatile memories. The storage device is configured to output storage throughput information. The storage system includes a host device configured to change connection configurations for the storage device based on the storage throughput information, wherein the host device changes the connection configurations by changing configurations for a transmitter path and a receiver path between the storage device and the host device, such that a configuration for the transmitter path and a configuration for the receiver path are changed independently.

According to another embodiment of the present disclosure, an operating method of a Universal Flash Storage (UFS) system including a Universal Flash Storage host and a Universal Flash Storage device, includes completing setting of M-PHY link configurations between the UFS host and the UFS device, sending, by the UFS host, a query request to read a descriptor, outputting, by the UFS device, a query response corresponding to the query request, the query response including a resource descriptor that includes a return value for the M-PHY link configurations, resetting, by the UFS host, link attributes for the Universal Flash Storage device based on the return value of the resource descriptor, sending, by the UFS host, a link attribute change request corresponding to the reset link attributes to the UFS device and changing, by the UFS device, the link attributes in response to the link attribute change request and sending, by the UFS device, a link attribute change response.

According to other embodiments of the present disclosure, a storage controller connected between a host device and a plurality of nonvolatile memories includes a resource management intellectual property (IP) configured to send a query response including a resource descriptor in response to a query request being received from the host device. The storage controller is configured to be connected to the host device in accordance with link attributes that are reset based on the resource descriptor, and the link attributes are reset by setting connections of transmitter (Tx) and receiver (Rx) path domains independently.

According to other embodiments of the present disclosure, a storage controller connected between a host device and a plurality of storage devices includes a Universal Flash Storage (UFS) interconnect (UIC) input/output interface connected to the host device to transmit and receive a pair of differential input signals and a pair of differential output signals, and a resource management intellectual property (IP) configured to control transmitter and receiver path domains for the differential input signals and the differential output signals based on storage throughput information, wherein the resource management IP is configured to set the transmitter and receiver path domains independently.

According to other embodiment of the present disclosure, an operating method of a storage controller includes connecting the storage controller to a host device in accordance with initial link configurations, receiving a query request to read a descriptor from the host device, sending a query response including a geometry descriptor to the host device based on the query request, receiving a power mode change request that is based on the query request, from the host device and resetting transmitter and receiver paths between the storage controller and the host device in response to the power mode change request.

Other features and embodiments may be apparent from the following detailed description, the drawings and the claims.

BRIEF DESCRIPTION OF THE DRAWINGS

The above and other embodiments and features of the present disclosure will become more apparent by describing in detail embodiments thereof with reference to the attached drawings, in which:

FIGS. 5 and 6 show resource descriptors according to some embodiments of the present disclosure.

FIG. 11 is a table for explaining the link attributes of a storage system according to some embodiments of the present disclosure.

FIG. 12 is a table for explaining resource descriptors according to some embodiments of the present disclosure.

DETAILED DESCRIPTION

Embodiments of the present disclosure will hereinafter be described with reference to the accompanying drawings.

Figure 1:
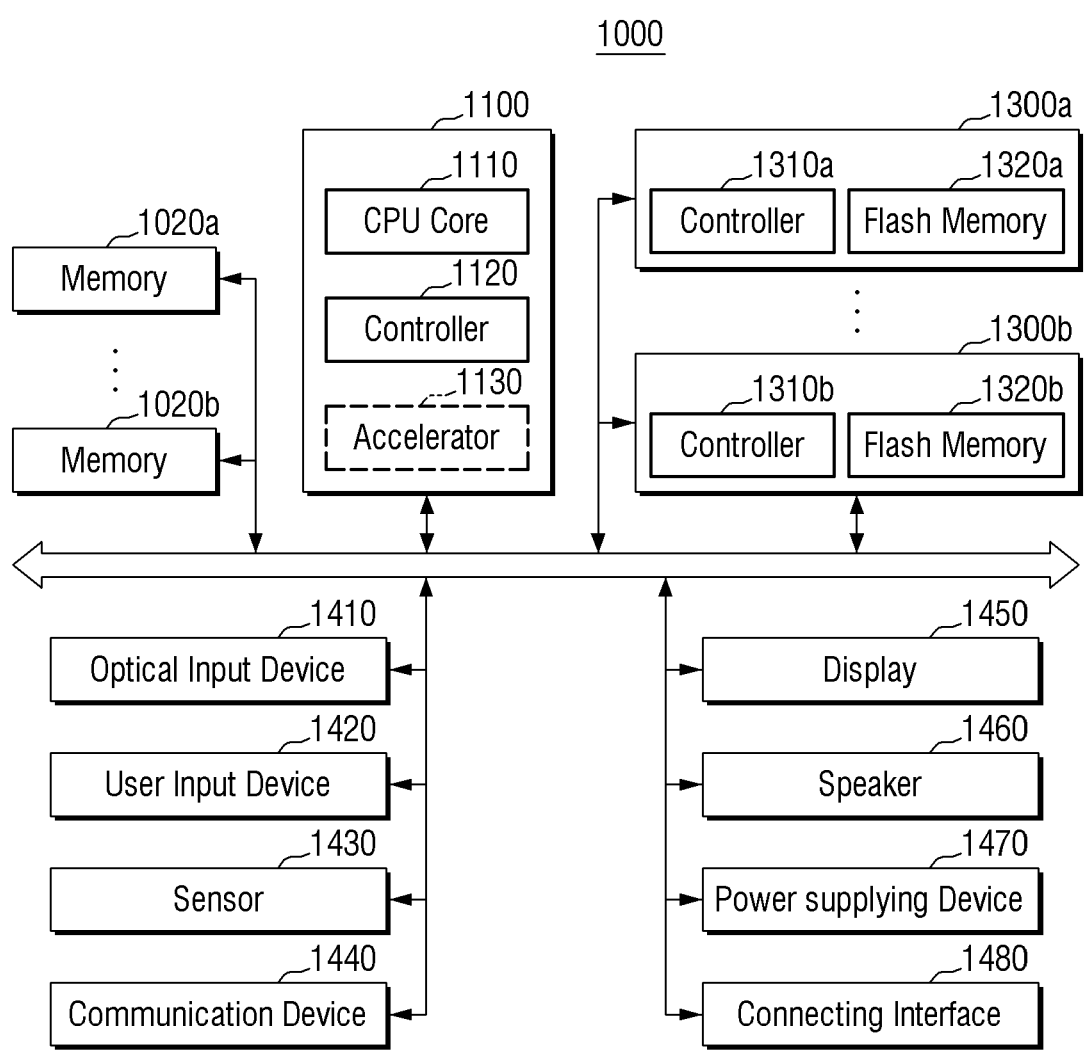
FIG. 1 is a block diagram of a system to which a storage device according to some embodiments of the present disclosure is applied.

FIG. 1 is a block diagram of a system to which a storage device according to some embodiments of the present disclosure is applied.

Referring to FIG. 1, a system 1000 may be a mobile system such as a mobile communication terminal, a smartphone, a tablet personal computer (PC), a wearable device, a healthcare device or an Internet-of-Things (IoT) device, but the present disclosure is not limited thereto. Alternatively, the system 1000 may be a PC, a laptop computer, a server, a media player or an automotive device such as a navigation device.

The system 1000 may include a main processor 1100, memories 1020a and 1020b and storage devices 1300a and 1300b and may further include an image capturing device 1410, a user input device 1420, a sensor 1430, a communication device 1440, a display 1450, a speaker 1460, a power supplying device 1470, and a connecting interface 1480.

The main processor 1100 may control the general operation of the system 1000, particularly, the operations of the other elements of the system 1000. The main processor 1100 may be implemented as a general-purpose processor, a dedicated processor, or an application processor.

The main processor 1100 may include one or more CPU cores 1110 and may further include a controller 1120 for controlling the memories 1020a and 1020b and/or the storage devices 1300a and 1300b. The main processor 1100 may further include an accelerator block 1130, which is a dedicated circuit for a high-speed data operations such as an artificial intelligence (AI) data operation. The accelerator block 1130 may include a graphics processing unit (GPU), a neural processing unit (NPU) and/or a data processing unit (DPU) and may be implemented as a physically separate chip from the other elements of the main processor 1100. As is traditional in the field of the disclosed technology, features and embodiments are described, and illustrated in the drawings, in terms of functional blocks, units, and/or modules. Those skilled in the art will appreciate that these blocks, units, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or similar, they may be programmed using software (e.g., microcode) to perform various functions discussed herein and may optionally be driven by firmware and/or software. Alternatively, each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units, and/or modules without departing from the scope of the inventive concepts. Further, the blocks, units, and/or modules of the embodiments may be physically combined into more complex blocks, units, and/or modules without departing from the scope of the inventive concepts. The above description also applies to functional items described with ~er or ~or.

The memories 1020a and 1020b may be used as main memories of the system 1000 and may include volatile memories such as static random-access memories (SRAMs) and/or dynamic random-access memories (DRAMs) or may include nonvolatile memories such as flash memories, phase-change random-access memory (PRAMs) or resistive random-access memory (RRAMs). In some embodiments, the memories 1020a and 1020b may be implemented in the same semiconductor package as the main processor 1100. For example, the memories 1020a and 1020b as well as the main processor 1100 can be stacked on a single package substrate and encapsulated by a single encapsulant.

The storage devices 1300a and 1300b may function as nonvolatile storage devices storing data without regard to whether power is supplied thereto and may have a larger storage capacity than the memories 1020a and 1020b. The storage devices 1300a and 1300b may include storage controllers 1310a and 1310b, respectively, and nonvolatile memory (NVM) storages 1320a and 1320b, respectively, which store data under the control of the storage controllers 1310a and 1310b. The NVM storages 1320a and 1320b may include two-dimensional (2D) or three-dimensional (3D) vertical-NAND (V-NAND) flash memories, but may include other nonvolatile memories such as PRAMs and/or RRAMs.

The storage devices 1300a and 1300b may be included in the system 1000 as being physically separate from the main processor 1100 or may be implemented in the same package as the main processor 1100. The storage devices 1300a and 1300b may be in the form of solid-state drives (SSDs) or memory cards and may thus be detachably coupled to the other elements of the system 1000 via an interface such as the connecting interface 1480. Alternatively, the storage devices 1300a and 1300b may be mounted on a printed circuit board to be embedded in another device such as, for example, a processor. The storage devices 1300a and 1300b may be devices to which standards such as Universal Flash Storage (UFS), embedded MultiMedia Card (eMMC) or Non-Volatile Memory express (NVMe) are applied, but the present disclosure is not limited thereto.

The image capturing device 1410 may be an optical input device configured to capture a still or moving image and may be a camera, a camcorder and/or a webcam.

The user input device 1420 may receive various types of data from the user of the system 1000 and may be a touchpad, a keypad, a keyboard, a mouse and/or a microphone.

The sensor 1430 may sense various types of physical quantities that can be obtained from outside the system 1000 and may convert the sensed physical quantities into electrical signals. The sensor 1430 may be a temperature sensor, a pressure sensor, an illuminance sensor, a position sensor, an acceleration sensor, a biosensor and/or a gyroscope.

The communication device 1440 may transmit signals to, or receive signals from, external devices outside the system 1000 in accordance with various communication protocols. The communication device 1440 may be configured to include an antenna, a transceiver and/or a modem.

The display 1450 and the speaker 1460 may function as output devices for outputting visual information and auditory information, respectively, to the user of the system 1000.

The power supplying device 1470 may appropriately convert power supplied by an embedded battery (not illustrated) of the system 1000 and/or an external power source (not illustrated) and may thereby supply power to the other elements of the system 1000.

The connecting interface 1480 may provide a connection between the system 1000 and an external device capable of being connected to the system 1000 and thereby exchanging data with the system 1000. The connecting interface 1480 may be implemented as, for example, an advanced technology attachment (ATA) interface, a serial ATA (SATA) interface, an external SATA (e-SATA) interface, a small computer small interface (SCSI), a serial attached SCSI (SAS) interface, a peripheral component interconnection (PCI), a PCI express (PCIe) interface, an NVMe interface, an IEEE 1394 interface, a universal serial bus (USB) interface, a secure digital (SD) card interface, a multimedia card (MMC) interface, an embedded multimedia card (eMMC) interface, a UFS interface, an embedded UFS (eUFS) interface or a compact flash (CF) card interface.

Figure 2:
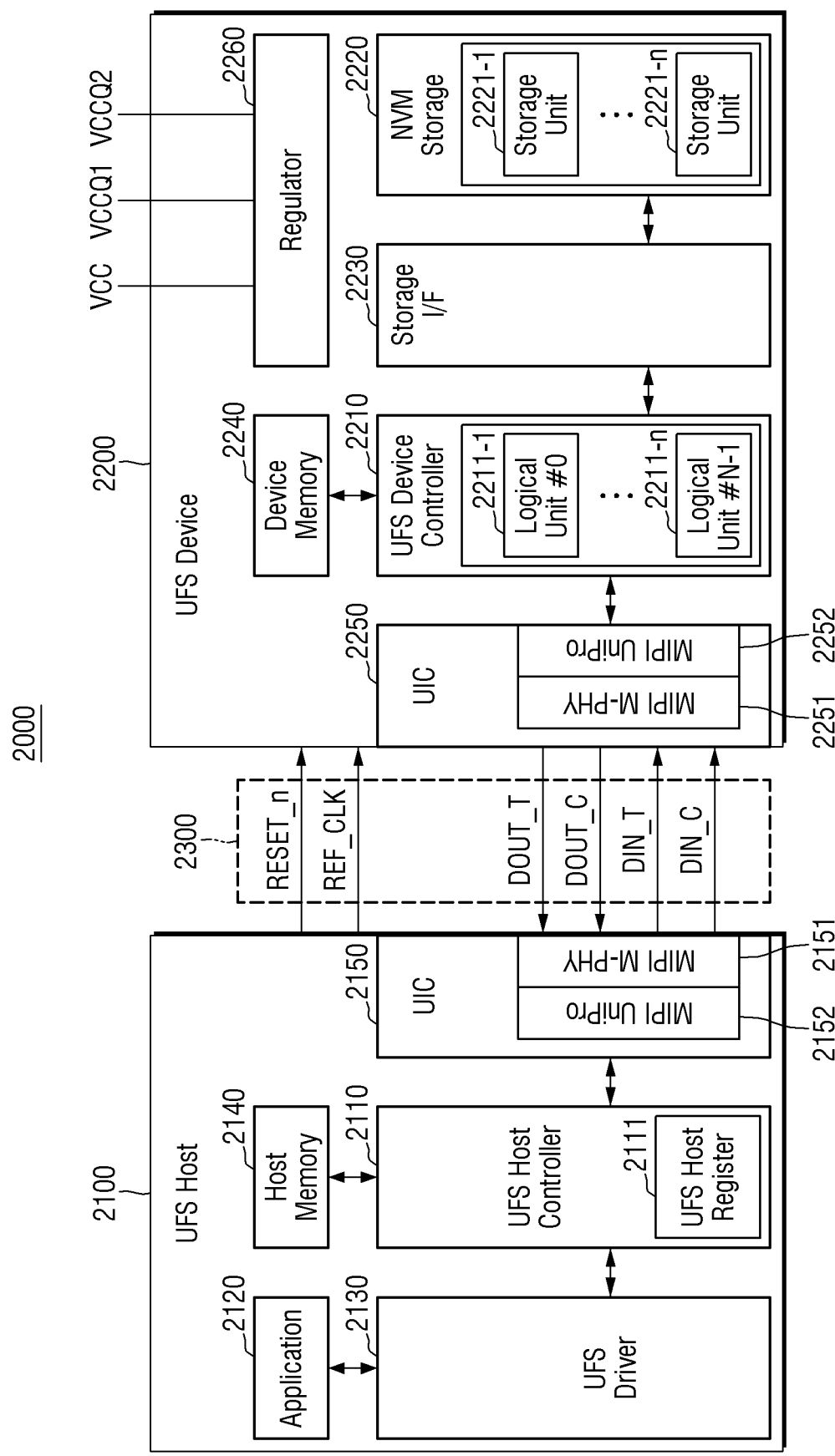
FIG. 2 is a block diagram of a storage system according to some embodiments of the present disclosure.

FIG. 2 is a block diagram of a storage system according to some embodiments of the present disclosure.

Referring to FIG. 2, a UFS system 2000, which is a system that conforms to the UFS standard published by the Joint Electron Device Engineering Council (JEDEC), may include a UFS host 2100, a UFS device 2200 and a UFS Interface 2300. The UFS system 2000 may also be referred to simply as a storage system. The above description of the system 1000 of FIG. 1 may be directly applicable to the UFS system 2000 of FIG. 2 without conflicting with the description that follows.

The UFS host 2100 and the UFS device 2200 may be connected to each other via the UFS interface 2300. In a case where the main processor 1100 of FIG. 1 is an application is processor, the UFS host 2100 may be implemented as part of the application processor. A UFS host controller 2110 and a host memory 2140 may correspond to the controller 1120 and the memories 1020a and 1020b, respectively, of FIG. 1. The UFS device 2200 may correspond to the storage devices 1300a and 1300b of FIG. 1, and a UFS device controller 2210 and a nonvolatile storage 2220 may correspond to the storage controllers 1310a and 1310b and the nonvolatile storages 1320a and 1320b, respectively, of FIG. 1.

The UFS host 2100 may include the UFS host controller 2110, an application 2120, a UFS driver 2130, the host memory 2140 and a UFS interconnect (UIC) layer 2150. The UFS device 2200 may include the UFS device controller 2210, the nonvolatile storage 2220, a storage interface 2230, a device memory 2240, a UIC layer 2250 and a regulator 2260. The nonvolatile storage 2220 may consist of a plurality of storage units 2221-1 to 2221-n, and the storage units 2221-1 to 2221-n may include 2D or 3D V-NAND flash memories or other nonvolatile memories such as PRAMs and/or RRAMs. The UFS device controller 2210 and the nonvolatile storage 2220 may be connected to each other via the storage interface 2230. The storage interface 2230 may be configured to conform to a standard such as Toggle or ONFI.

The application 2120 may be a program that wishes to and is configured to communicate with the UFS device 2200 to use the functions of the UFS device 2200. The application 2120 may transmit an input/output (I/O) request (IOR) to the UFS driver 2130 to input data to, or output data from, the UFS device 2200. An IOR may refer to a read request, a write request and/or a discard request, but the present disclosure is not limited thereto.

The UFS driver 2130 may manage the UFS host controller 2110 via a UFS-host controller interface (HCI). The UFS driver 2130 may convert an IOR into a UFS command, which is defined by the UFS standard, and may transmit the UFS command to the UFS host controller 2110. One IOR may be converted into multiple UFS commands. UFS commands may be commands defined by the SCSI standard or may be commands specific to the UFS standard.

The UFS host controller 2110 may transmit a UFS command provided by the UFS driver 2130 to the UIC layer 2250 of the UFS device 2200 via the UIC layer 2150 and the UFS interface 2300. In this process, a UFS host register 2111 of the UFS host controller 2110 may function as a command queue (CQ).

The UIC layer 2150 of the UFS host 2100 may include a "MIPI M-PHY" 2151 and a "MIPI UniPro" 2152, and the UIC layer 2250 of the UFS device 2200 may include a "MIPI M-PHY" 2251 and a "MIPI UniPro" 2252.

The UFS interface 2300 may include a line for transmitting a reference clock REF_CLK, a line for transmitting a hardware reset signal RESET_n for the UFS device 2200, a pair of lines for transmitting a pair of differential input signals DIN_T and DIN_C and a pair of lines for transmitting a pair of differential output signals DOUT_T and DOUT_C.

The frequency of the reference clock REF_CLK, which is provided from the UFS host 2100 to the UFS device 2200, may be one of 19.2 MHz, 26 MHz, 38.4 MHz and 52 MHz, but the present disclosure is not limited thereto. The frequency of the reference clock REF_CLK may be changed even during the operation of the UFS host 2100, i.e., during the transmission of data between the UFS host 2100 and the UFS device 2200. The UFS device 2200 may generate clocks of various frequencies based on the reference clock REF_CLK from the UFS host 2100, with the use of a phase-locked loop (PLL). Also, the UFS host 2100 may set the data rate between the UFS host 2100 and the UFS device 2200 based on the frequency of the reference clock REF_CLK. That is, the data rate between the UFS host 2100 and the UFS device 2200 may be determined based on the frequency of the reference clock REF_CLK.

The UFS interface 2300 may support multiple lanes, and each of the multiple lanes may be implemented as a differential pair. For example, the UFS interface 2300 may include at least one receiver (Rx) lane and at least one transmitter (Tx) lane. The pair of lines for transmitting the differential input signals DIN_T and DIN_C may form the RX lane, and the pair of lines for transmitting the differential output signals DOUT_T and DOUT_C may form the Tx lane. FIG. 2 illustrates that there are one Tx lane and one Rx lane, but the numbers of Tx lanes and Rx lanes may vary.

Rx and Tx lanes may transmit data via serial communication, and as the Rx and Tx lanes are separate, full-duplex communication can be enabled between the UFS host 2100 and the UFS device 2200. That is, the UFS device 2200 may transmit data to the UFS host 2100 via the TX lane while receiving data from the UFS host 2100 via the Rx lane. Control data such as a command and user data to be stored in, or read out from, the nonvolatile storage 2220 may be transmitted from the UFS host 2100 to the UFS device 2200 via the same lane. Accordingly, there is no need to provide an additional lane other than a pair of Rx lanes and a pair of Tx lanes between the UFS host 2100 and the UFS device 2200.

The UFS device controller 2210 of the UFS device 2200 may control the general operation of the UFS device 2200. The UFS device controller 2210 may manage the nonvolatile storage 2220 in units of logical units 2211, which are the unit of storing logic data. The number of logical units 2211 may be 8, but the present disclosure is not limited thereto. The UFS device controller 2210 may include a flash translation layer (FTL) and may translate a logical data address transmitted by the UFS host 2100, for example, a logical block address (LBA), into a physical data address, for example, a physical block address (PBA), with the use of address mapping information of the FTL. Logical blocks for storing the user data in the UFS system 2000 may have a predetermined size. For example, the logical blocks may be set to a minimum of 4 Kbytes.

In response to a command being input from the UFS host 2100 to the UFS device 2200 via the UIC layer 2250, the UFS device controller 2210 may perform an operation corresponding to the input command and may transmit a completion response to the UFS host 2100 upon the completion of the operation corresponding to the input command.

For example, in a case where the UFS host 2100 wishes to store the user data in the UFS device 2200, the UFS host 2100 may transmit a data write command to the UFS device 2200. In response to a ready-to-transfer response being received from the UFS device 2200, the UFS host 2100 may transmit the user data to the UFS device 2200. The UFS device controller 2210 may temporarily store the user data in the device memory 2240 and may then store the tempo-rarily-stored user data at a particular location in the nonvolatile storage 2220 based on the address mapping information of the FTL.

In another example, in a case where the UFS host 2100 wishes to read out the user data from the UFS device 2200, the UFS host 2100 may transmit a data read command to the UFS device 2200. The UFS device controller 2210 may read out the user data from the nonvolatile storage 2220 in response to the data read command and may temporarily store the user data in the device memory 2240. In this process, the UFS device controller 2210 may detect and correct error in the user data using an error correction code (ECC) circuit (not illustrated) embedded therein. Then, the UFS device controller 2210 may transmit the user data temporarily stored in the device memory 2240 to the UFS host 2100. The UFS device controller 2210 may further include an advanced encryption standard (AES) circuit (not illustrated), and the AES circuit may encrypt or decrypt data input to the UFS device controller 2210, using a symmetric key algorithm.

The UFS host 2100 may store commands to be transmitted to the UFS device 2200, in the UFS host register 2111, which may function as a CQ in a predetermined order and may transmit the stored commands to the UFS device 2200 in the predetermined order. Even when a previous command is still being processed by the UFS device 2200, i.e., when a notification is yet to be received indicating that the processing of the previous command is complete, the UFS host 2100 may transmit a subsequent command being in standby in the CQ to the UFS device 2200, and thus, the UFS device 2200 may receive the subsequent command while processing the previous command. For example, the number of commands that can be stored in the CQ, i.e., queue depth, may be 32. The CQ may be implemented as a circular queue indicating the beginning and end of a sequence of commands stored in a queue with a head pointer and a tail pointer.

Each of the storage units 2221-1 to 2221-$n$ may include a memory cell array (not illustrated) and a control circuit (not illustrated), which controls the operation of the memory cell array. The memory cell array include a 2D or 3D memory cell array. The memory cell array may include a plurality of memory cells, and the memory cells may be single-level cells (SLCs) capable of storing 1-bit data or may be multi-level cells (MLCs), triple-level cells (TLCs) or quadruple-level cells (QLCs). The 3D memory cell array may include a V-NAND string in which at least one memory cell is vertically oriented to be located above another memory cell.

Power supply voltages VCC, VCCQ and VCCQ2 may be input to the UFS device 2200. The power supply voltage VCC may be a main power supply voltage for the UFS device 2200 and may be 2.4 V to 3.6 V. The power supply voltage VCCQ may be for supplying a range of low voltages, mainly for the UFS device controller 2210, and may be 1.14 V to 1.26 V. The power supply voltage VCCQ2 may be for supplying a range of voltages lower than the power supply voltage VCC, but higher than the power supply voltage VCCQ, mainly for an I/O interface such as the MIPI M-PHY 2251, and may be 1.7 V to 1.95 V. The power supply voltages VCC, VCCQ and VCCQ2 may be supplied to the elements of the UFS device 2200 via the regulator 2260. The regulator 2260 may be implemented as a set of unit regulators connected to different power supply voltages.

Figure 3:
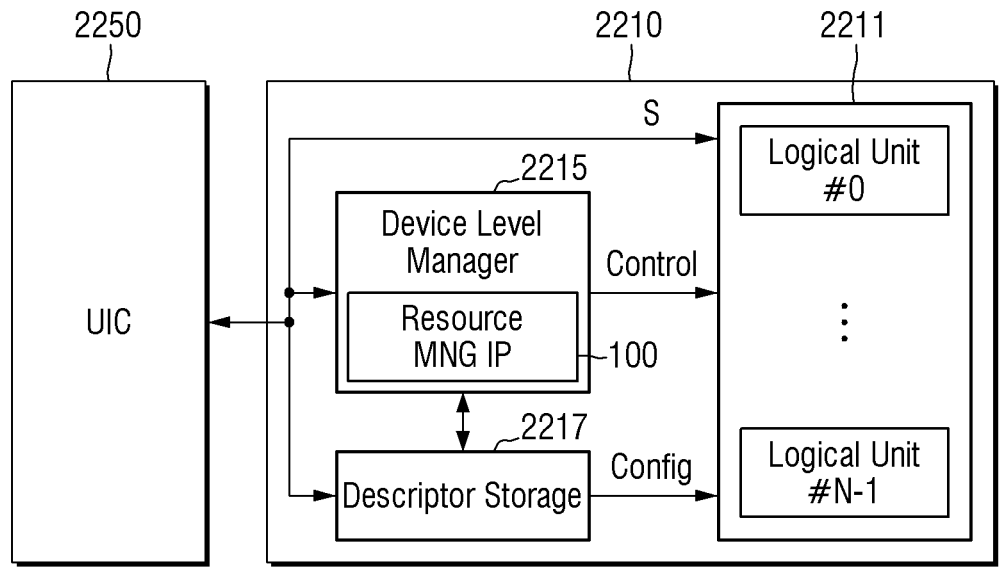
FIG. 3 is a block diagram of a storage controller according to some embodiments of the present disclosure.
Figure 4:
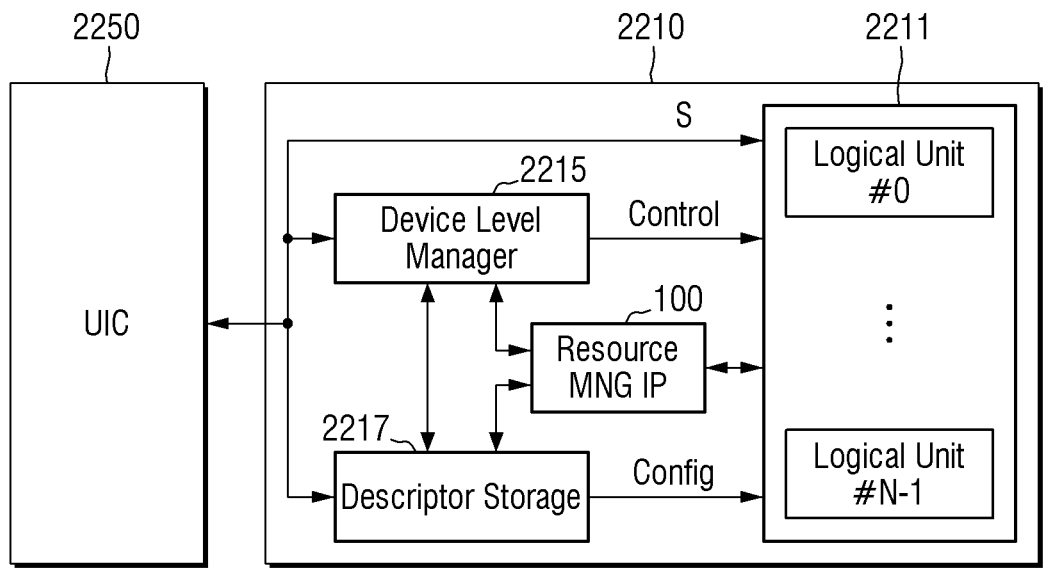
FIG. 4 is a block diagram of a storage controller according to some embodiments of the present disclosure.

FIG. 3 is a block diagram of a storage controller according to some embodiments of the present disclosure, and FIG. 4 is a block diagram of a storage controller according to some embodiments of the present disclosure.

Referring to FIG. 3, UFS device controller (also called "storage controller") 2210 is connected to the UFS host 2100 via the UIC layer 2250 and to the storage device 2220 via the logical units 2211.

In some embodiments, the storage controller 2210 may include a device level manager 2215, a descriptor storage 2217 and the logical units 2211.

The device level manager 2215 may perform a request from the application 2120 by allocating one of the logical units 2211. In some embodiments, a plurality of different applications 2120 may be provided. For example, the UFS driver 2130 of the UFS host 2100 may allocate unique initiator identifiers (IDs) to three applications, i.e., applications A, B and C, and the device level manager 2215 may allocate logical units 2211 to applications A, B and C based on requests from applications A, B and C. In this example, one logical unit 2211 (e.g., logical unit #2) may be allocated for the requests from all the three applications, i.e., applications A, B and C, to perform operations. Alternatively, different logical units 2211 may be allocated for the requests from the three different applications, i.e., applications A, B and C, to perform operations (e.g., read, write and discard operations).

Each of the logical units 2211 may be allocated to at least one of the storage units 2221-1 to 2221-n included in the storage device 2220. Alternatively, each of the logical units 2211 may be allocated to at least part of one of the storage units 2221-1 to 2221-n. For example, logical unit #1 may be allocated to an entire storage unit from 2221-1 to 2221-n, i.e., storage unit #2221-3, or one third of storage unit #2221-3. A storage unit in this case may be, for example, a semiconductor device such as a semiconductor chip or semiconductor package. As used herein, a semiconductor device may refer, for example, to a device such as a semiconductor chip (e.g., memory chip and/or logic chip formed on a die), a stack of semiconductor chips, a semiconductor package including one or more semiconductor chips stacked on a package substrate, or a package-on-package device including a plurality of packages. These devices may be formed using ball grid arrays, wire bonding, through substrate vias, or other electrical connection elements, and may include memory devices such as volatile or non-volatile memory devices. Semiconductor packages may include a package substrate, one or more semiconductor chips, and an encapsulant formed on the package substrate and covering the semiconductor chips.

The device level manager 2215 may include a resource management Intellectual Property (IP) 100.

The resource management IP 100 may collect resource information regarding each of the storage units 2221-1 to 2221-n, each of the logical units 2211 and the UFS device 2200 and may transmit the collected resource information in response to receipt of a query request from the UFS host 2100.

The resource management IP 100 may collect storage throughput information and may transmit the storage throughput information to the UFS host 2100. The storage throughput information may include, for example, at least one of read and write delays in the storage device 2220, the I/O speed between the UFS device 2200 and the host device 2100, the type of memory cells of the storage device 2220 (e.g., whether the memory cells of the storage device 2220 are SLCs or MLCs), the density of memory cells of the storage device 2220 (e.g., the number of nonvolatile memories included in the storage device 2220, i.e., whether the storage device 2220 has a storage capacity of 64 GB, 128 GB, 256 GB, 512 GB, or 1 TB), operation attributes (e.g., an indication of by which nanometer process the nonvolatile memories of the storage device 2220 are fabricated, which is associated with a set of operation attributes), internal buffer size, a channel quantity such as the number of channels for the nonvolatile memories of the storage device 2220, the type and number of control units, the operating frequency of an internal module, or the maximum throughput of an intelligent device designed contrary to initial intentions, in case that a bottleneck is caused by the throughput of the intelligent device.

The descriptor storage 2217 may store information regarding a plurality of descriptors defined as a plurality of configuration (config) values for the operation of the UFS device 2200. The descriptors, which are signals transmitted between the UFS host 2100 and the UFS device 2200, may be defined as arbitrary return values and configuration (config) values corresponding to the return values, in accordance with a predefined set of rules between the UFS host 2100 and the UFS device 2200, and may be stored in the descriptor storage 2217.

For example, in response to a query request to read a descriptor, i.e., "Query Request UPIU_READ Descriptor", being received from the UFS host 2100, the resource management IP 100 of the storage controller 2210 may select a descriptor from the descriptor storage 2217 in response to the query request and may select a return value corresponding to collected storage throughput information. The resource management IP 100 may include the selected descriptor and the selected return value in a query response and may send the query response to the UFS host 2100. Also, in response to a query request including a descriptor being received from the UFS host 2100, the resource management IP 100 may identify a config value corresponding to the return value of the descriptor from the descriptor storage 2217 and may perform an operation for the UFS device 2200 in accordance with the identified config value. This will be described later in detail with reference to FIG. 5.

Referring to FIG. 4, the resource management IP 100 may be included in the storage controller 2210 as a separate element from the device level manager 2215. The device level manager 2215 may generally control the operations of the UFS host 2200 and the storage units 2221-1 to 2221-n, and the resource management IP 100 may collect resource information, i.e., storage throughput information, may transmit descriptors and return values based on the storage throughput information whenever a request is received from the UFS host 2100 and may allow the UFS storage device 2220 or the storage units 2221-1 to 2221-n to be set in accordance with config values corresponding to the return values.

FIGS. 5 and 6 show resource descriptors according to some embodiments of the present disclosure.

The descriptor storage 2217 may store a plurality of descriptors and return values and config values for the descriptors. Each of the descriptors may include a descriptor identifier (i.e., "descriptor IDN"), a return value (or a descriptor index or simply an index), a descriptor selector and length values (i.e., bit length from a most significant bit (MSB) to a least significant bit (LSB)).

For example, a geometry descriptor may be included in the descriptors stored in the descriptor storage 2217. The geometry descriptor is a geometry parameter of the UFS device 2200. In a case where the UFS host 2100 sends a query request (i.e., "query request UPIU") including the geometry descriptor to the UFS device 2200, the descriptor identifier, return value, and descriptor selector of the geometry descriptor may be 07h, 00h, and 00h, respectively.

The geometry descriptor may include a plurality of return values that are each defined by an offset value. The geometry descriptor may include, for example, a resource descriptor regarding the internal state of a storage device. The resource descriptor may be defined in, for example, a region corresponding to an offset value of 57h or 58h in the geometry descriptor.

The resource management IP 100 may select a return value for collected internal information (e.g., storage throughput information) regarding the resource descriptor and may transmit the selected return value to the UFS host 2100.

Referring to FIG. 5, the geometry descriptor may include a resource descriptor "bRecommendRxLevel", and the resource descriptor "bRecommendRxLevel" may select a return value for the Rx power mode of the Rx path between the UFS host 2100 and the UFS device 2200.

Referring to FIG. 6, the geometry descriptor may include a resource descriptor "bRecommendTxLevel", and the resource descriptor "bRecommendTxLevel" may select a return value for the Tx power mode of the Tx path between the UFS host 2100 and the UFS device 2200. Thus, power mode change requests may be received, and responses may be sent based on the requests.

Referring to FIGS. 5 and 6, "Offset" denotes the location of the resource descriptor of the UFS device 2200 in the geometry descriptor and has a size of 1 bit. The descriptor storage 2217 may store a plurality of return values corresponding to storage throughput information for the resource descriptor of the UFS device 2200. The resource descriptor "bRecommendRxLevel" may have a return value ranging "Level 1" to "Level 20", and the return value may be determined by the resource management IP 100 based on the state of the UFS device 2200.

FIGS. 7 through 10 are flowcharts illustrating an operating method of a memory system according to some embodiments of the present disclosure.

Figure 7:
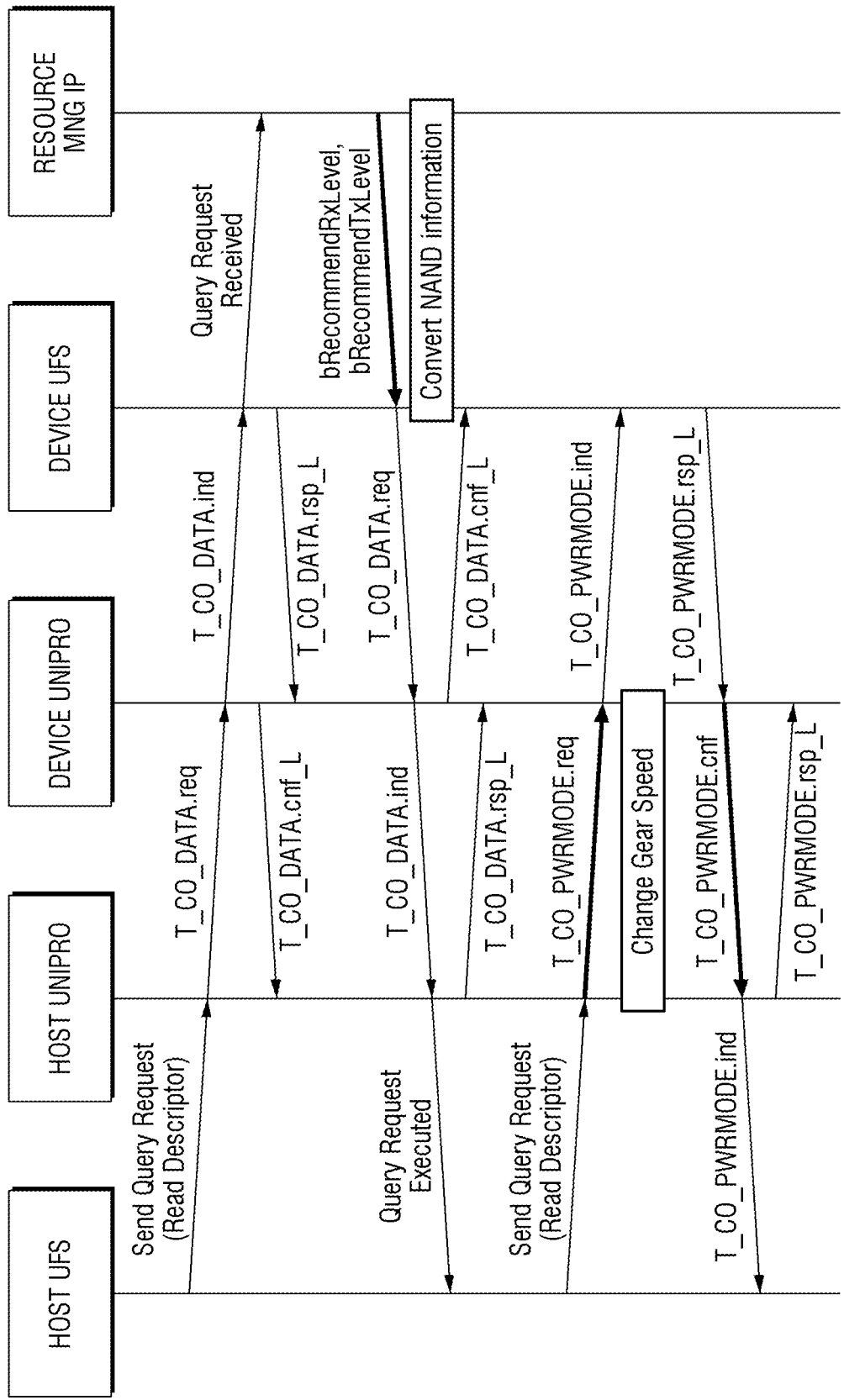
FIGS. 7 through 10 are flowcharts illustrating an operating method of a memory system according to some embodiments of the present disclosure.

Referring to FIG. 7, the UFS host 2100 sends a query request including a read descriptor. The "MIPI M-PHY" 2151 and the "MIPI UniPro" 2152 of the UFS host 2100 may send the query request to the "MIPI M-PHY" 2251 and the "MIPI UniPro" 2252 of the UFS device 2200, and the "MIPI UniPro" 2252 of the UFS device 2200 may send the query request to the storage controller 2210, particularly, to the resource management IP 100.

The resource management IP 100 may select a return value corresponding to the storage throughput information of the UFS device 2200 and may transmit the selected return value to the UFS host 2110 via the "MIPI UniPro" 2152 of the UFS device 2200 by including the selected descriptor in a resource descriptor "bRecommendRxLevel" or "bRecommendTxLevel".

For example, referring to FIGS. 5 through 7, in response to a determination being made that the return value of the resource descriptor "bRecommendRxLevel" is "Level 10", the resource management IP 100 may transmit "Level 10" to the UFS host 2100 as the return value of the resource descriptor "bRecommendRxLevel". That is, the resource management IP 100 may return a resource descriptor reflecting internal information of the storage device 2200 to the UFS host 2100.

The UFS device 2200 (particularly, the storage controller 2210) may transmit a resource descriptor to the host controller 2110 via the "MIPI M-PHY" 2251 and the "MIPI UniPro" 2252 and the "MIPI M-PHY" 2151 and the "MIPI UniPro" 2152.

The connection between "UniPro" and "M-PHY" layers is clear from the MIPI M-PHY specification version 4.1 (and above) and the MIPI UniPro specification version 1.8 (and above), and thus, a detailed description thereof will be omitted. The MIPI M-PHY specification version 4.1 and the MIPI UniPro specification version 1.8 are incorporated by reference herein in their entirety. Subsequently, the UFS host 2100 may reset the link attributes for the UFS device 2200 based on the return value of the resource descriptor, the UFS host 2100 may then send a link attribute change request corresponding to the reset link attributes to the UFS device 2200 (e.g., "Send Query Request" and "T_CO_PWRMODE.req"), and the UFS device 2200 may change the link attributes in response to the link attribute change request and send a link attribute change response (e.g., "T_CO_PWRMODE.rsp L" and "T_CO_PWRMODE.cnf") to the UFS host 2100.

Figure 8:
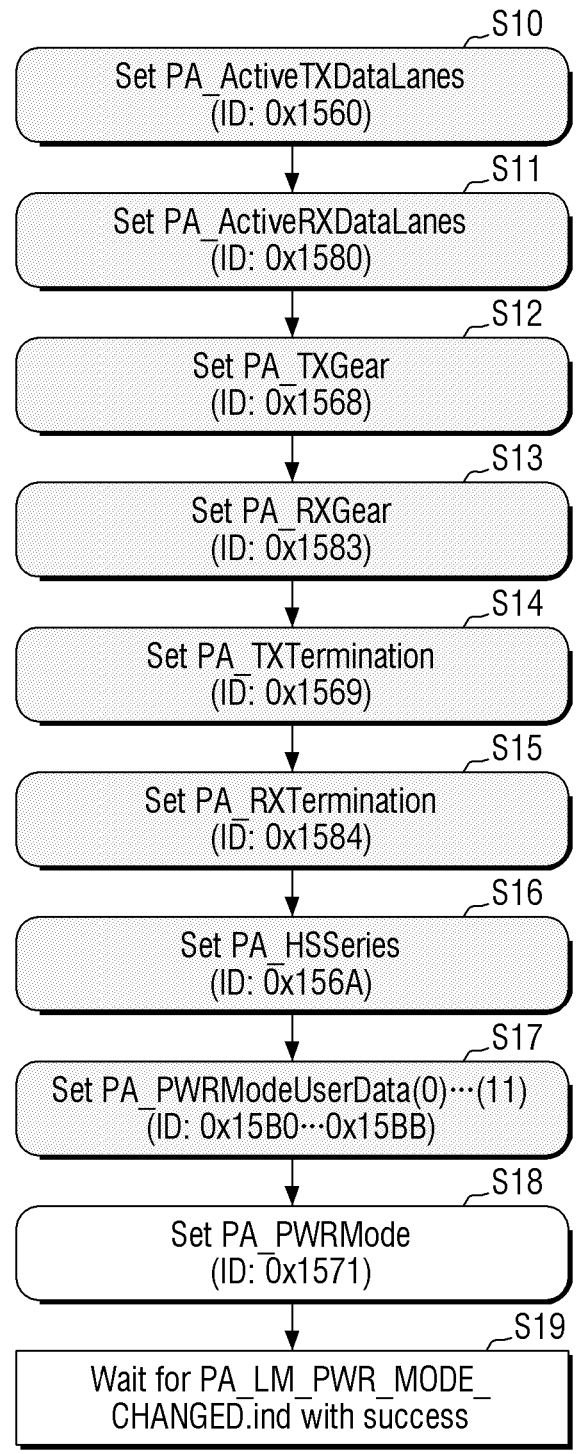

Referring to FIG. 8, at an initial state where the "UniPro" and "M-PHY" layers of a host device and the "UniPro" and "M-PHY" layers of a storage controller are connected, the host device determines how many data lanes are activated for each of Tx and Rx paths (S10 and S11), configures the gear speeds of the Tx and Rx paths to an initial value for the activated data lanes (S12 and S13), and determines whether there exists termination (S14 and S15). Thereafter, the host device identifies the "HSSeries" of the connection between the host device and the storage controller (S16), conducts a test as to which power mode is to be set for transmitting or receiving user data (S17), and sets an optimal power mode (S18). Power modes that can be set may include, for example, "Fast_Mode", "Slow_Mode", "FastAuto_Mode" and "SlowAuto_Mode".

In S18, the host device may change power modes with reference to the return value of a resource descriptor received from the storage controller for a power mode initially set in S17. In S19, the host device transmits a config value for a link attributes corresponding to the power mode set in S18 to the storage controller and thereby resets the connection between a Tx path domain and an Rx path domain. In this case, the Tx path domain and the Rx path domain may be initially configured to be symmetrical and may be configured later to be independent upon the change of power modes and thus to be connected asymmetrically. S18 will be described later in detail with reference to FIGS. 8 and 10.

Figure 9:
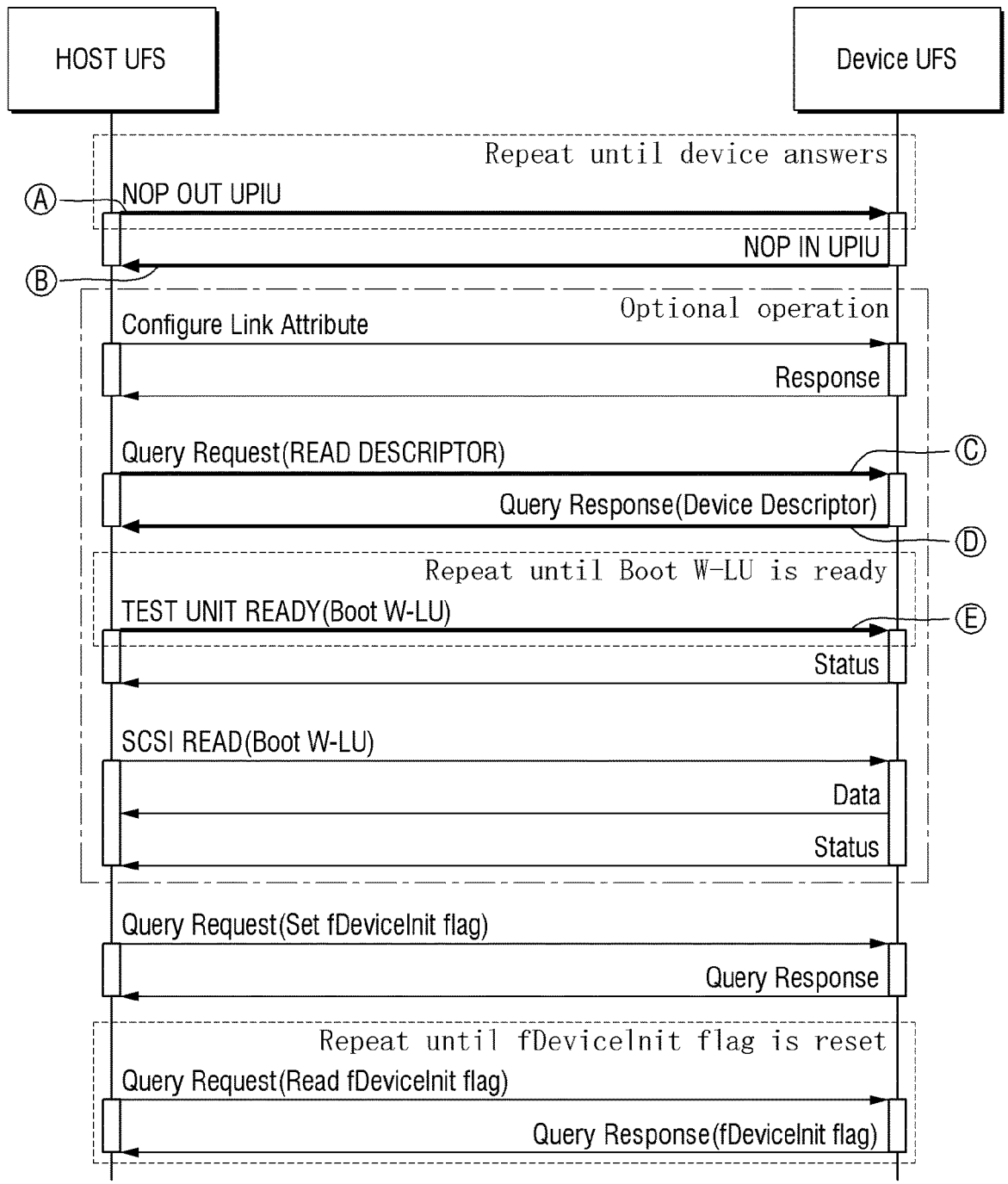
Figure 10:
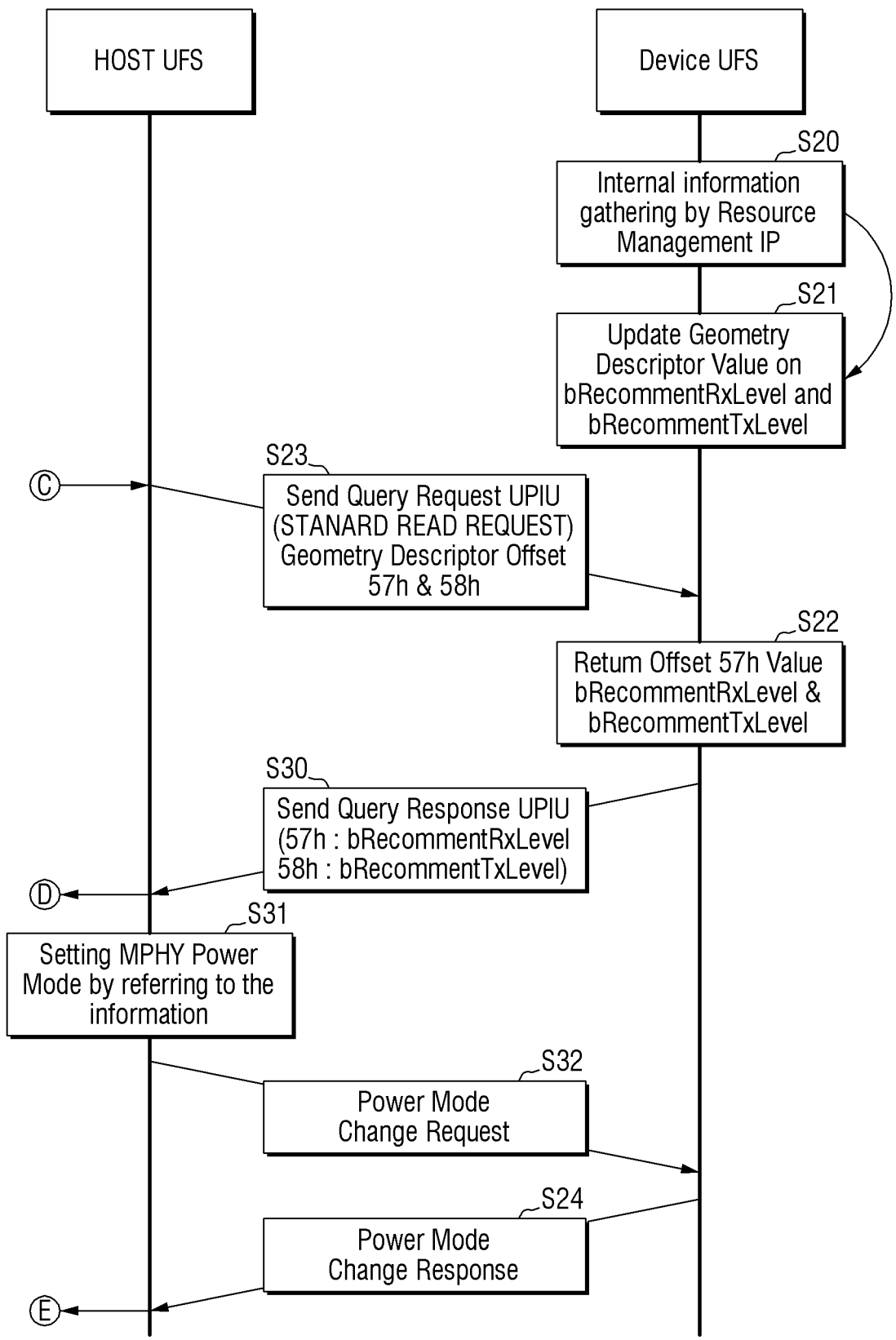

Referring to FIGS. 8 through 10, it is assumed that a host controller and a storage controller have already completed the connection configuration up to M-PHY layers via S10 through S16, before step A.

The host controller configures the link attributes of Tx and Rx paths in accordance with arbitrary initial link attributes ("Configure Link Attribute"). The storage controller configures the Tx and Rx paths in accordance with the configured link attributes ("Response").

Specifically, referring to FIGS. 9 and 10, a resource management IP collects internal information regarding a nonvolatile memory, i.e., storage throughput information (S20), and selects a return value for a resource descriptor that corresponds to the storage throughput information. Resource descriptors "bRecommendRxLevel" "bRecommendTxLevel" update the storage throughput information in accordance with the result of real-time monitoring performed by the resource management IP (S21).

Thereafter, the host controller sends a query request to read a resource descriptor, i.e., "Query Request(READ DESCRIPTOR)", to the storage controller (S23 or step C).

The resource management IP in the storage controller includes a return value for the storage throughput information in a query response including a resource descriptor, i.e., "Query Response(Device Descriptor)", and sends the query response (step D). For example, the storage controller then selects a return value of 57h or 58h (step S22), includes the selected return value in a query response and sends the query response to the host controller (S30). The query response may include a return value according to the embodiment of FIGS. 3 through 6.

The host controller identifies the return value included in the received query response and changes the link attributes of the Tx and Rx paths based on the identified return value (S31). For example, the host controller may change the initial settings of an M-PHY layer based on the identified return value and send a power mode change request to the storage controller (S32). The storage controller changes the link attributes of the Tx and Rx paths based on a return value included in the power mode change request and sends, to the host controller, a power mode change response indicating that the change of power modes is complete (S24).

In response to receipt of the power mode change response, the host controller identifies the changed M-PHY link attributes and performs a subsequent operation (e.g., step E).

FIG. 11 is a table for explaining the link attributes of a storage system according to some embodiments of the present disclosure, and FIG. 12 is a table for explaining resource descriptors according to some embodiments of the present disclosure.

As a result of the connection reconfiguration according to the embodiment of FIGS. 7 through 10, Tx and Rx path domains between the host device and the storage device can be configured independently based on the internal state of the storage device, i.e., the storage throughput information. For example, the Tx and Rx path domains may be initially configured to be symmetrical with each other, but may be reconfigured later by the storage throughput information to be connected asymmetrically or connected to different clock frequencies, different speeds or different numbers of lanes or to "HS Series".

The link attributes of the Tx and Rx paths between the host device and the storage device may be configured as shown in FIGS. 11 and 12. Referring to FIG. 11, the MIPI M-PHY 5.0 specification defines "HS-GEAR1" through "HS-GEAR5" as gear speeds for a fast mode. For example, when "HS-GEAR1" is set, "Rate A-series" and "Rate B-series" may be set to 1248 bps and 1459.2 bps, respectively, and the number of data lanes may be set to 1 or 2.

The host controller identifies a return value included in a received query response and changes the link attributes of the Tx and Rx paths based on the identified return value. Referring to FIG. 12, if the return value of a resource descriptor for the Rx path is 0x6, the Rx path may be reset to the gear speed for "HS-Gear2". That is, as the power mode is changed to "HS-Gear2", the link attributes of the Rx path may be reset to a speed of 2918.4 bps and a lane quantity of 1 or greater. As can be seen, a different HSSeries (e.g. Rate A-series or Rate B-series) can be selected.

Figure 13:
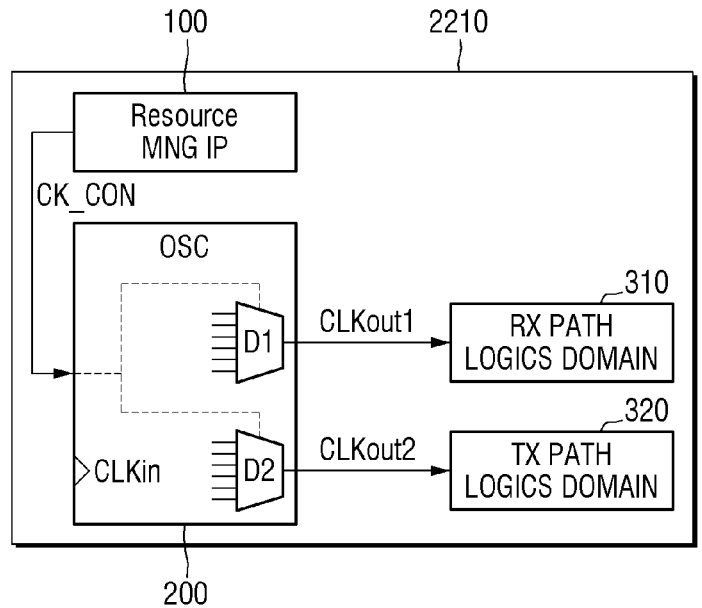
FIGS. 13 through 15 are block diagrams of storage controllers according to some embodiments of the present disclosure.
Figure 14:
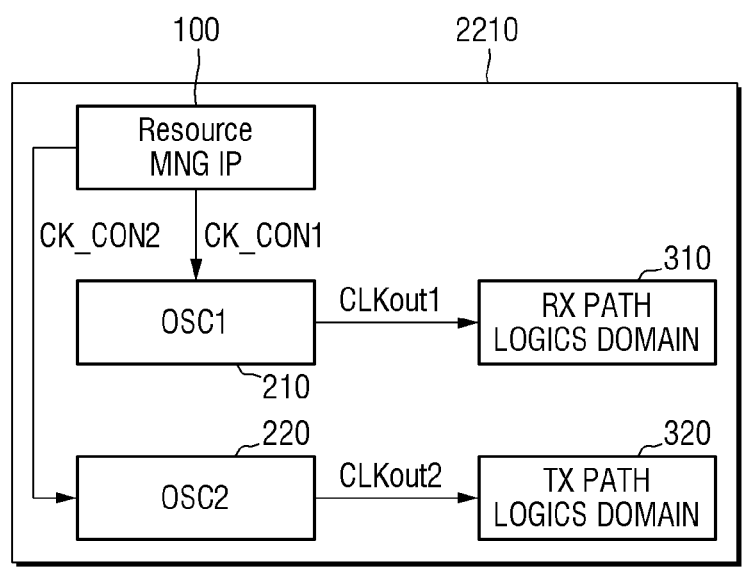
Figure 15:
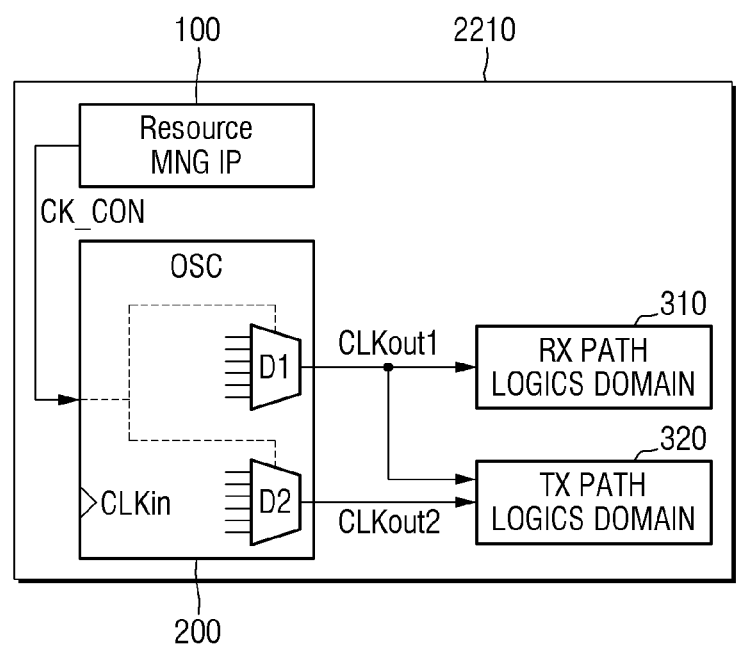

FIGS. 13 through 15 are block diagrams of storage controllers according to some embodiments of the present disclosure. Each of the storage controllers can control the clock speed of Tx and Rx paths based on the internal state of a storage device, without a request to change settings from a host device 2100.

Referring to FIGS. 13 and 14, a storage controller 2210 may include a resource management IP 100, an oscillator 200, an Rx path domain 310, and a Tx path domain 320.

The resource management IP 100 may control clock frequencies provided to the Rx and Tx path domains 310 and 320 independently, based on storage throughput information.

The oscillator 200 may include a plurality of dividers D1 and D2, as illustrated in FIG. 13. The dividers D1 and D2 may have independent divider ratios for a single input clock signal CLKin in accordance with a control signal CK_CON. For example, the divider D1 may generate a first clock CLKout1 at a divider ratio selected from among a plurality of divider ratios for the input clock signal CLKin by the control signal CK_CON from the resource management IP 100, and the divider D2 may generate a second clock CLKout2 at a divider ratio selected from among the divider ratios for the input clock signal CLKin by the control signal CK_CON from the resource management IP 100.

Alternatively, referring to FIG. 14, a plurality of first and second oscillators 210 and 220 may be provided. The first oscillator OSC1 may generate a first clock signal CLKout1 in accordance with a first control signal CK_CON1, and the second oscillator OSC2 may generate a second clock signal CLKout2 in accordance with a second control signal CK_CON2. In this case, the first and second oscillators OSC1 and OSC2 may share the same input clock signal or may have different input clock signals.

The first clock signal CLKout1 may be input to the Rx path domain 310, and the second clock signal CLKout2 may be input to the Tx path domain 320. The first and second clock signals CLKout1 and CLKout2 may be set to have independent clock frequencies, thereby setting a link connection between a UFS host 2100 and a UFS device 2200. In this manner, connection configurations between the UFS host 2100 and UFS device 2200 can be changed by setting a first link connection for a transmitter path and setting a second link connection, which is different from the first link connection, for a receiver path.

Alternatively, referring to FIG. 15, the oscillator 200 may provide the same clock signal, e.g., a clock signal CLKout1, to the Rx and Tx path domains 310 and 320. For example, the clock signal CLKout1 may be provided to both the Rx and Tx path domains 310 and 320 in accordance with the initial settings of a link connection of a UFS system, may be changed into two clock signals having independent clock frequencies, for example, the first and second clock signals CLKout1 and CLKout2 of FIG. 13, and may be changed back into a single clock signal having a symmetric clock frequency, thereby adjusting settings of a link connection between a UFS host 2100 and a UFS device 2200.

Figure 16:
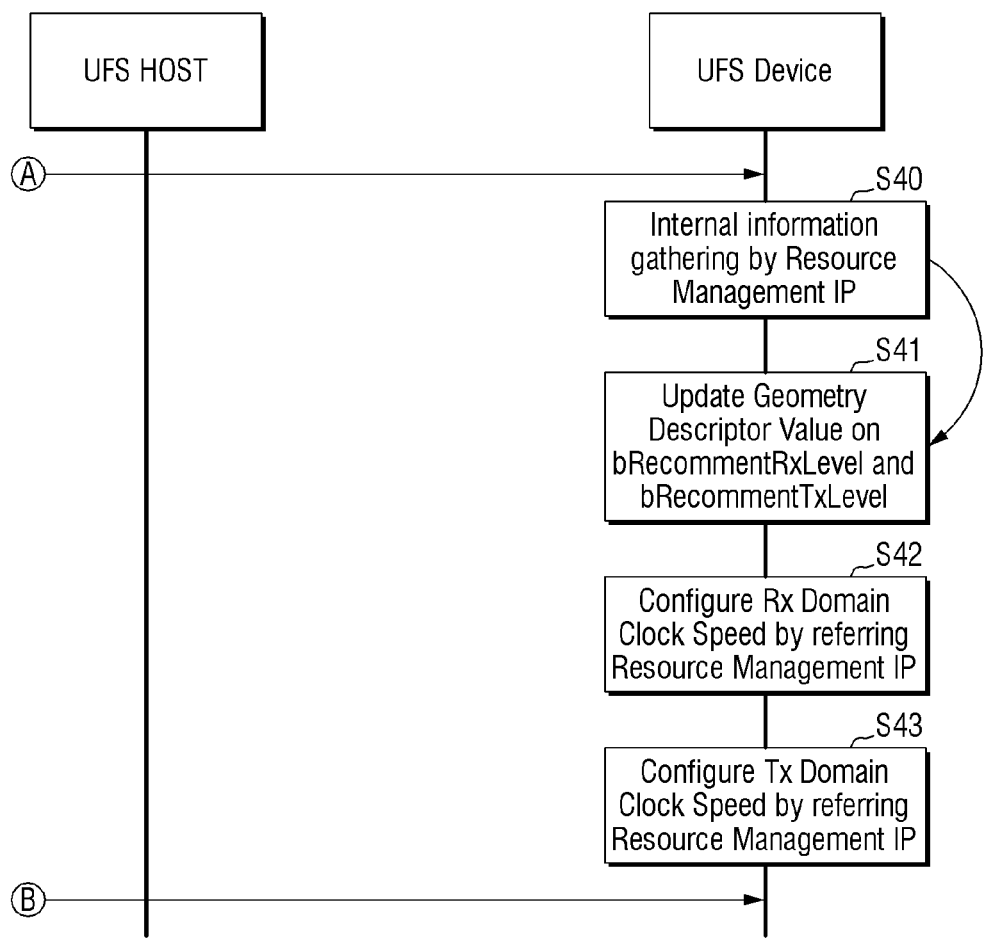
FIG. 16 is a flowchart illustrating an operating method of a UFS system according to some embodiments of the present disclosure.

FIG. 16 is a flowchart illustrating an operating method of a UFS system according to some embodiments of the present disclosure.

Referring to FIGS. 9 and 16, once the initial configuration of a link connection is complete (step A), a resource management IP may collect internal information of a storage device, i.e., storage throughput information (S40). The return values of resource descriptors may be updated based on the storage throughput information (S41). The resource management IP may control the clock speed for a Tx or Rx path domain with a control signal CLK_CON (S42 or S43), regardless of the update of the return values of the resource descriptors, thereby setting the link connection between a UFS host 2100 and a UFS device 2200.

Figure 17:
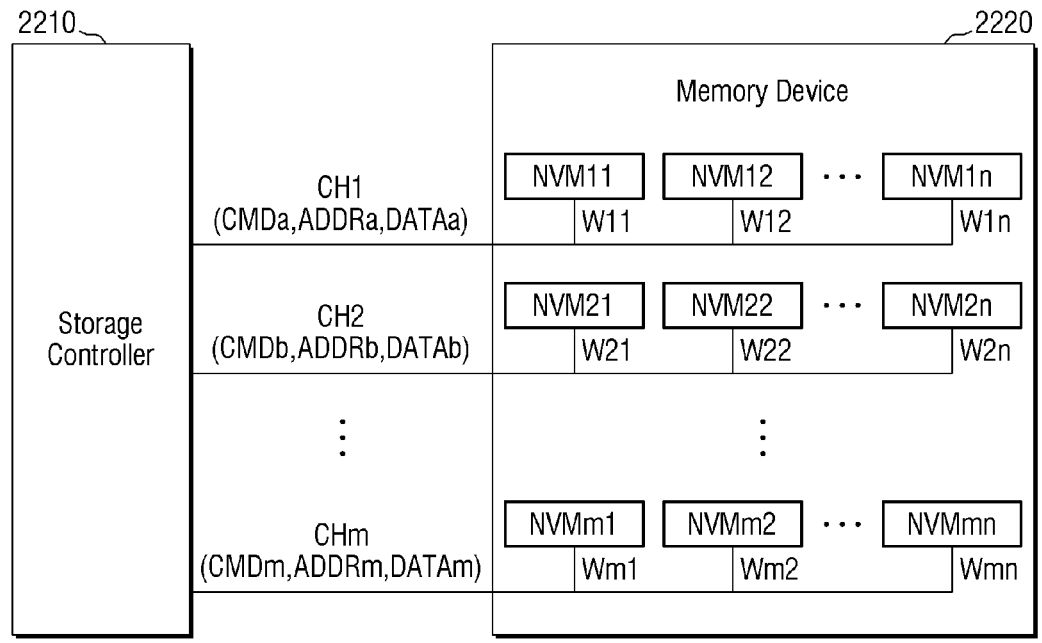
FIG. 17 is a block diagram of a storage system according to some embodiments of the present disclosure.

FIG. 17 is a block diagram of a storage system according to some embodiments of the present disclosure.

Referring to FIG. 17, a storage system 2000 may include a memory device 2220 and a storage controller 2210. The storage system 2000 may support a plurality of first through m-th channels CH1 through CHm, and the memory device 2220 and the storage controller 2210 may be connected via the first through m-th channels CH1 through CHm. For example, the storage system 2000 may be implemented as a storage device such as an SSD.

The memory device 2220 may include a plurality of nonvolatile memory devices NVM11 through NVMmn. The nonvolatile memory devices NVM11 through NVMmn may be connected to one of the channels CH1 through CHm via their respective ways. For example, the nonvolatile memory devices NVM11 through NVM1$n$ may be connected to the first channel CH1 via ways (e.g., paths) W11 through W1$n$, respectively, and the nonvolatile memory devices NVM21 through NVM2$n$ may be connected to the second channel CH2 via ways (e.g., paths) W21 through W2$n$, respectively. The nonvolatile memory devices NVM11 through NVMmn may be implemented in units of arbitrary memories capable of operating in response to individual commands from the storage controller 2210. For example, the nonvolatile memory devices NVM11 through NVMmn may be implemented as chips or dies, but the present disclosure is not limited thereto.

The storage controller 2210 may transmit signals to, or receive signals from, the memory device 2220 via the first through m-th channels CH1 through CHm. For example, the storage controller 2210 may transmit commands CMDa through CMDm, addresses ADDRa through ADDRm and data DATAa through DATAm to the memory device 2220, or receive the data DATAa through DATAm from the memory device 2220, via the first through m-th channels CH1 through CHm.

The storage controller 2210 may select one of the nonvolatile memory devices connected to each of the first through m-th channels CH1 through CHm and may transmit signals to, or receive signals from, the selected nonvolatile memory device. For example, the storage controller 2210 may select the nonvolatile memory device NVM11 from among the nonvolatile memory devices NVM11 through NVM1$n$ connected to the first channel CH1. In this example, the storage controller 2210 may transmit the command CMDa, the address ADDRa and the data DATAa to the nonvolatile memory device NVM11, or receive the data DATAa from the nonvolatile memory device NVM11, via the first channel CH1.

The storage controller 2210 may transmit signals to, and receive signals from, the memory device 2220 in parallel. For example, the storage controller 2210 may transmit the command CMDb to the memory device 2220 via the second channel CH2 while transmitting the command CMDa to the memory device 2220 via the first channel CH1. For example, the storage controller 2210 may receive the data DATAb from the memory device 2220 via the second channel CH2 while receiving the data DATAa from the memory device 2220 via the first channel CH1.

The storage controller 2210 may control the general operation of the memory device 2220. The storage controller 2210 may control the nonvolatile memory devices NVM11 through NVMmn, which are connected to the first through m-th channels CH1 through CHm, by transmitting signals to the first through m-th channels CH1 through CHm. For example, the storage controller 2210 may control one of the nonvolatile memory devices NVM11 through NVM1$n$ by transmitting the command CMDa and the address ADDRa to the first channel CH1.

The nonvolatile memory devices NVM11 through NVMmn may operate under the control of the storage controller 2210. For example, the nonvolatile memory device NVM11 may program the data DATAa in accordance with the command CMDa, the address ADDRa and the data DATAa provided to the first channel CH1. For example, the nonvolatile memory device NVM21 may read the data DATAb in accordance with the command CMDb and the address ADDRb provided to the second channel CH2 and may transmit the data DATAb to the storage controller 2210. A similar method such as described in the above embodiments may be used to control the link attributes of the Tx and Rx path between the storage controller 2210 and the memory device 2220.

FIG. 17 illustrates that the memory device 2220 communicates with the storage controller 200 via m channels and includes n nonvolatile memory devices for each of the m channels, but the number of channels and the number of nonvolatile memory devices connected to each of the channels may vary.

Figure 18:
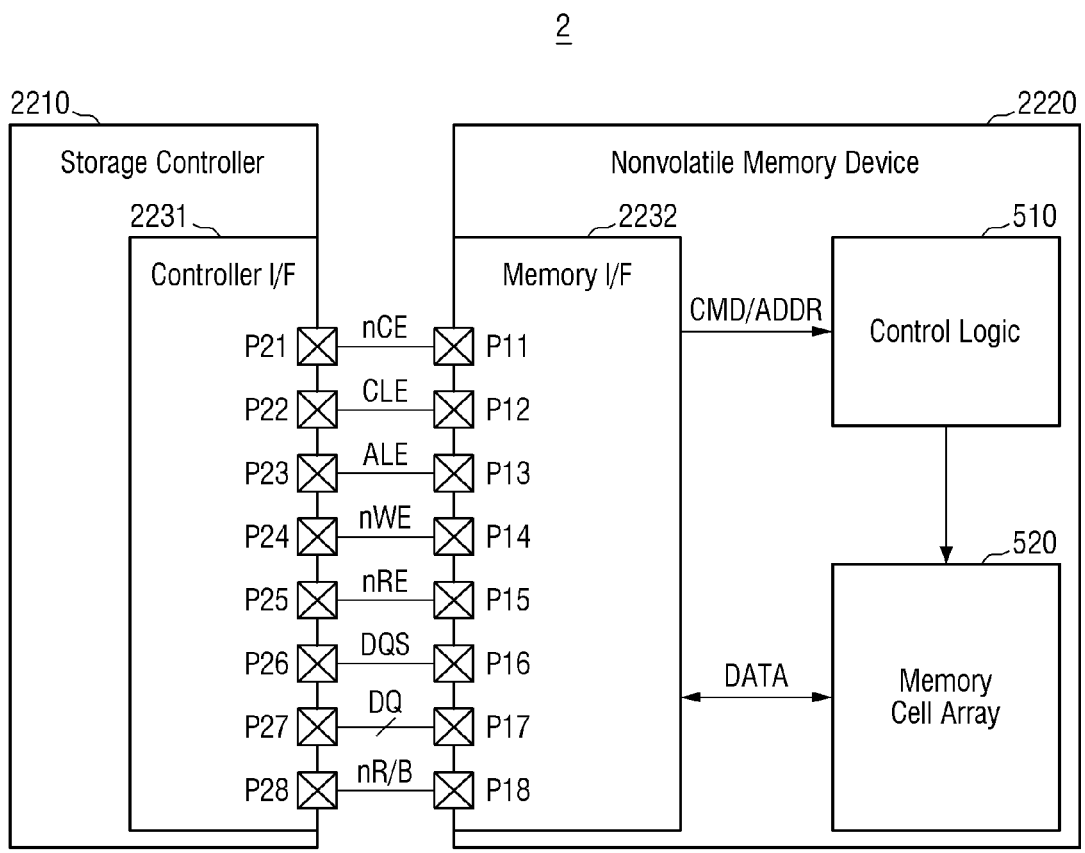
FIG. 18 is a block diagram of a storage system according to some embodiments of the present disclosure.

FIG. 18 is a block diagram of a storage system according to some embodiments of the present disclosure.

Referring to FIG. 18, a storage system 2000 may include a memory device 2220 and a storage controller 2210. The memory device 2220 may correspond to one of the nonvolatile memory devices NVM11 through NVMmn of FIG. 17, which communicate with the storage controller 2210 via one of the first through m-th channels CH1 through CHm. The storage controller 2210 may correspond to the storage controller 2210 of FIG. 17.

The memory device 2220 may include first through eighth pins P11 through P18, a memory interface circuit 2232, a control logic circuit 510 and a memory cell array 520.

The memory interface circuit 2232 may receive a chip enable signal nCE from the storage controller 2210 via the first pin P11. The memory interface circuit 2232 may transmit signals to, or receive signals from, the storage controller 2210 via the second through eighth pins P12 through P18 in accordance with the chip enable signal nCE. For example, when the chip enable signal nCE is enabled (or has, for example, a low level), the memory interface circuit 2232 may transmit signals to, or receive signals from, the storage controller 2210 via the second through eighth pins P12 through P18.

The memory interface circuit 2232 may receive a command latch enable signal CLE, an address latch enable signal ALE and a write enable signal nWE from the storage controller 2210 via the second through fourth pins P12 through P14. The memory interface circuit 2232 may receive a data signal DQ from, or transmit a data signal DQ to, the storage controller 2210 via the seventh pin P17. A command CMD, an address ADDR and data "DATA" may be transmitted via a data signal DQ. For example, a data signal DQ may be transmitted via multiple data signal lines. In this example, the seventh pin P17 may include multiple pins corresponding to the multiple data signals.

The memory interface circuit 2232 may acquire a command CMD from a data signal DQ received during an enable period (e.g., a high-level period) of the command latch enable signal CLE, based on the toggle timing of the write enable signal nWE. The memory interface circuit 2232 may acquire an address ADDR from a data signal DQ received during an enable period (e.g., a high-level period) of the address latch enable signal ALE, based on the toggle timing of the write enable signal nWE.

The write enable signal nWE may maintain a static state (e.g., a high- or low-level state) and may then toggle between a high level and a low level. For example, the write enable signal nWE may toggle during a period when a command CMD or an address ADDR is being transmitted. Accordingly, the memory interface circuit 2232 may acquire a command CMD or an address ADDR based on the toggle timing of the write enable signal nWE.

The memory interface circuit 2232 may receive a read enable signal nRE from the storage controller 2210 via the fifth pin P15. The memory interface circuit 2232 may receive a data strobe signal DQS from, or transmit a data strobe signal DQS to, the storage controller 2210 via the sixth pin P16.

In an operation of outputting data "DATA" by the memory device 2220, the memory interface circuit 2232 may receive the read enable signal nRE that toggles, via the fifth pin P15 before the output of the data "DATA". The memory interface circuit 2232 may generate a data strobe signal DQS that toggles in accordance with the toggling of the read enable signal nRE. For example, the memory interface circuit 2232 may generate a data strobe signal DQS that begins to toggle a predetermined delay (e.g., "tDQSRE") after the beginning of the toggling of the read enable signal nRE. The memory interface circuit 2232 may transmit a data signal DQ including the data "DATA" based on the toggle timing of the data strobe signal DQS. Accordingly, the data "DATA" may be transmitted to the storage controller 2210 in line with the toggle timing of the data strobe signal DQS.

In an operation of inputting data "DATA" by the memory device 2220, in a case where a data signal DQ including the data "DATA" is received from the storage controller 2210, the memory interface circuit 2232 may receive a data strobe signal DQS that toggles with the data "DATA" from the storage controller 2210. The memory interface circuit 2232 may acquire the data "DATA" from the data signal DQ based on the toggle timing of the data strobe signal DQS. For example, the memory interface circuit 2232 may acquire the data "DATA" by sampling the data signal DQ at rising and falling edges of the data strobe signal DQS.

The memory interface circuit 2232 may transmit a ready/busy output signal nR/B to the storage controller 2210 via the eighth pin P18. The memory interface circuit 2232 may transmit state information of the memory device 2220 to the storage controller 2210 via the ready/busy output signal nR/B. In a case where the memory device 2220 is busy performing internal operations, the memory interface circuit 2232 may transmit a ready/busy output signal nR/B indicating that the memory device 2220 is busy to the storage controller 2210. In a case where the memory device 2220 is ready because there are no internal operations being performed in the memory device 2220 or the internal operations are complete, the memory interface circuit 2232 may transmit a ready/busy output signal nR/B indicating that the memory device 2220 is ready to the storage controller 2210. For example, when the memory device 2250 is reading data "DATA" from the memory cell array 520 in response to a page read command, the memory interface circuit 2232 may transmit a ready/busy output signal nR/B indicating that the memory device 2220 is busy (or has, for example, a low level) to the storage controller 2210. For example, when the memory device 2220 is programming data "DATA" to the memory cell array 520 in response to a program command, the memory interface circuit 2232 may transmit a ready/busy output signal nR/B indicating that the memory device 2220 is busy to the storage controller 2210.

The control logic circuit 510 may generally control various operations of the memory device 2220. The control logic circuit 510 may receive a command/address CMD/ADDR acquired by the memory interface circuit 2232. The control logic circuit 510 may generate control signals for controlling the other elements of the memory device 2220 based on the received command/address CMD/ADDR. For example, the control logic circuit 510 may generate various control signals for programming data "DATA" to, or reading data "DATA" from, the memory cell array 520.

The memory cell array 520 may store data "DATA" acquired by the memory interface circuit 2232, under the control of the control logic circuit 510. The memory cell array 520 may output the stored data "DATA" to the memory interface circuit 2232 under the control of the control logic circuit 510.

The memory cell array 520 may include a plurality of memory cells. For example, the memory cells may be flash memory cells, but the present disclosure is not limited thereto. Alternatively, the memory cells are RRAM cells, ferroelectric random-access memory (FRAM) cells, PRAM cells thyristor random-access memory (TRAM) cells, or magnetic random-access memory (MRAM) cells. The memory cells will hereinafter be described as being, for example, NAND flash memory cells.

The storage controller 2210 may include first through eighth pins P21 through P28 and a controller interface circuit 2231. The first through eighth pins P21 through P28 may correspond to the first through eighth pins P11 through P18, respectively, of the memory device 2220.

The controller interface circuit 2231 may transmit the chip enable signal nCE to the memory device 2220 via the first pin P21. The controller interface circuit 2231 may transmit signals to, or receive signals from, a memory device 2220 selected by the chip enable signal nCE, via the second through eighth pins P22 through P28.

The controller interface circuit 2231 may transmit the command latch enable signal CLE, the address latch enable signal ALE and the write enable signal nWE to the memory device 2220 via the second through fourth pins P22 through P24. The controller interface circuit 2231 may transmit a data signal DQ to, or receive a data signal DQ from, the memory device 2220 via the seventh pin P27.

The controller interface circuit 2231 may transmit a data signal DQ including a command CMD or an address ADDR to the memory device 2220 together with the write enable signal nWE that toggles. As an enabled command latch enable signal CLE is transmitted, the controller interface circuit 2231 may transmit a data signal DQ including a command CMD to the memory device 2220. As an enabled address latch enable signal ALE is transmitted, the controller interface circuit 2231 may transmit a data signal DQ including an address ADDR to the memory device 2220.

The controller interface circuit 2231 may transmit the read enable signal nRE to the memory device 2220 via the fifth pin P25. The controller interface circuit 2231 may receive a data strobe signal DQS from, or transmit a data strobe signal DQS to, the memory device 2220 via the sixth pin P26.

In an operation of outputting data "DATA by the memory device 2220, the controller interface circuit 2231 may generate the read enable signal nRE that toggles and may transmit the read enable signal nRE to the memory device 2220. For example, the controller interface circuit 2231 may generate a read enable signal nRE that is switched from a static state (e.g., a high- or low-level state) to a toggle state before the output of the data "DATA". Accordingly, a data strobe signal DQS that toggles based on the read enable signal nRE can be generated in the memory device 2220. The controller interface circuit 2231 may receive a data signal DQ including the data "DATA" from the memory device 2220 together with the data strobe signal DQS that toggles. The controller interface circuit 2231 may acquire the data "DATA" from the data signal DQ based on the toggle timing of the data strobe signal DQS.

In an operation of inputting data "DATA" by the memory device 2220, the controller interface 2231 may generate the data strobe signal DQS that toggles. For example, the controller interface circuit 2231 may generate a data strobe signal DQS that is switched from a static state (e.g., a high- or low-level state) to a toggle state before the transmission of the data "DATA". The controller interface circuit 2231 may transmit a data signal DQ including the data "DATA" to the memory device 2220 based on the toggle timing of the data strobe signal DQS.

The controller interface circuit 2231 may receive a ready/busy output signal nR/B from the memory device 2220 via the eighth pin P28. The controller interface circuit 2231 may determine the state of the memory device 2220 based on the ready/busy output signal nR/B. A similar method such as described in the above embodiments may be used to control the link attributes of the Tx and Rx path between the storage controller 2210 and the memory device 2220.

Figure 19:
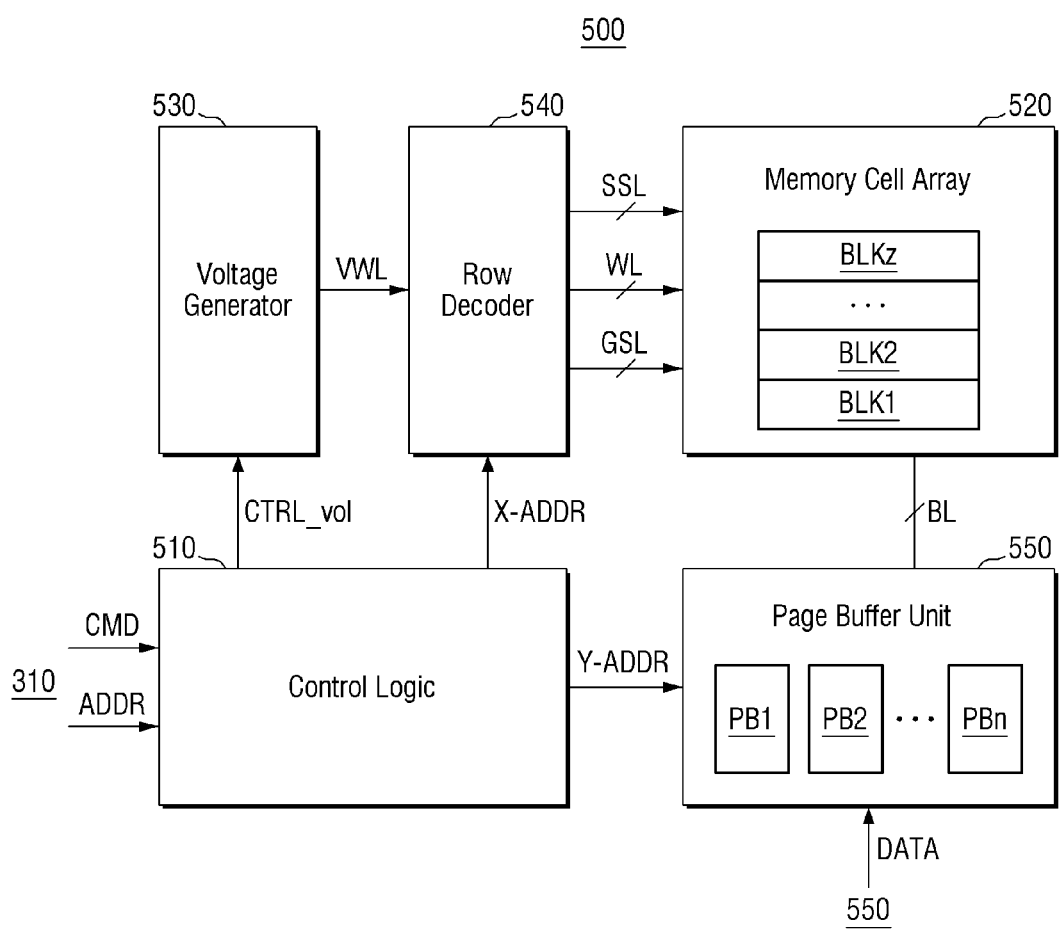
FIG. 19 is a block diagram of the memory device of FIG. 18.

FIG. 19 is a block diagram of the memory device of FIG. 18.

Referring to FIG. 19, a memory device 2220 may include a control logic circuit 510, a memory cell array 520, a page buffer unit 550, a voltage generator 530 and a row decoder 540. Although not specifically illustrated in FIG. 19, the memory device 2220 may further include a memory interface circuit and may also include a column logic, a pre-decoder, a temperature sensor, a command decoder and an address decoder.

The control logic circuit 510 may generally control various operations of the memory device 2220. The control logic circuit 510 may output various control signals in response to a command CMD and/or an address ADDR from the memory interface circuit. For example, the control logic circuit 510 may output a voltage control signal CTRL_vol, a row address X-ADDR and a column address Y-ADDR.

The memory cell array 520 may include a plurality of memory blocks BLK1 through BLKz (where z is a positive integer), and each of the memory blocks BLK1 through BLKz may include a plurality of memory cells. The memory cell array 520 may be connected to the page buffer unit 550 via bitlines BL and to the row decoder 540 via wordlines WL, string selection lines SSL and ground selection lines GSL.

The memory cell array 520 may include a three-dimensional (3D) memory cell array, and the 3D memory cell array may include a plurality of NAND strings. Each of the NAND strings may include memory cells connected to wordlines that are vertically stacked on a substrate. U.S. Pat. Nos. 7,679,133, 8,553,46, 8,654,587 and 8,559,235 and Korean Patent Application Publication No. 2011/0233648 show examples of such a 3D memory cell array, and are incorporated herein in their entirety by reference. The memory cell array 520 may include a two-dimensional (2D) memory cell array, and the 2D memory cell array may include a plurality of NAND strings that are arranged in row and column directions.

The page buffer unit 550 may include a plurality of page buffers PB1 through PBn (where n is an integer of 3 or greater), and the page buffers PB1 through PBn may be connected to the memory cells via the bitlines BL. The page buffer unit 550 may select at least one of the bitlines BL in response to the column address Y-ADDR. The page buffer unit 550 may operate as a write driver or a sense amplifier depending on its operating mode. For example, during a program operation, the page buffer unit 550 may apply a bitline voltage corresponding to data to be programmed to the selected bitline BL. For example, during a read operation, the page buffer unit 550 may sense data stored in memory cells corresponding to the selected bitline BL by sensing a current or a voltage from the selected bitline BL.

The voltage generator 530 may generate various voltages for performing program, read and discard operations based on the voltage control signal CTRL_vol. For example, the voltage generator 530 may generate a program voltage, a read voltage, a program verification voltage and a discard voltage as wordline voltages VWL.

The row decoder 540 may select one of the wordlines WL in response to the row address X-ADDR and may select one of the string selection lines SSL. For example, during a program operation, the row decoder 540 may apply the program voltage and the program verification voltage to the selected wordline WL. For example, during a read operation, the row decoder 540 may apply the read voltage to the selected wordline WL.

Figure 20:
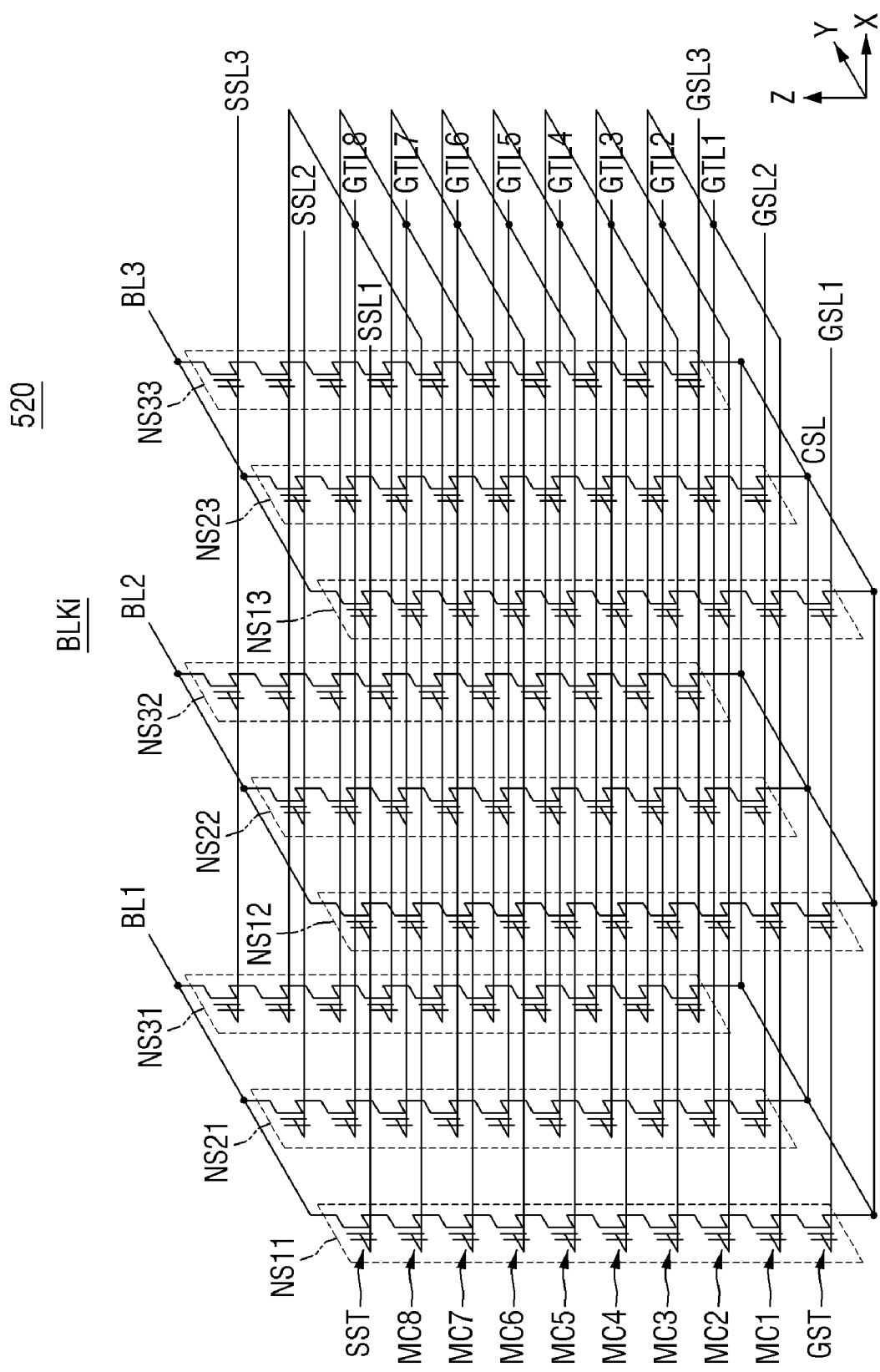
FIG. 20 is an equivalent circuit diagram of a 3D V-NAND structure that can be applied to a UFS device according to some embodiments of the present disclosure.

FIG. 20 is an equivalent circuit diagram of a 3D V-NAND structure that can be applied to a UFS device to perform the methods according to embodiments of the present disclosure described above.

In a case where a storage module of a UFS device is implemented as a 3D V-NAND flash memory, each of a plurality of memory blocks of the storage module may be represented by FIG. 20.

Referring to FIG. 20, a memory block BLKi may be a 3D memory block that is formed three-dimensionally on a substrate. For example, a plurality of memory NAND strings included in the memory block BLKi may be formed vertically with respect to the substrate.

The memory block BLKi may include a plurality of memory NAND strings NS11 through NS33, which are connected between bitlines BL1, BL2, and BL3 and a common source line CSL. Each of the memory NAND strings NS11 through NS33 may include a string selection transistor SST, a plurality of memory cells MC1 through MC8, and a ground selection transistor GST. FIG. 20 illustrates that each of the memory NAND strings NS11 through NS33 includes eight memory cells, but the present disclosure is not limited thereto.

Each string selection transistor SST may be connected to one of string selection lines SSL1 through SSL3. The memory cells MC1 through MC8 may be connected to gate lines GTL1 through GTL8, respectively. The gate lines GTL1 through GTL8 may correspond to wordlines, and some of the gate lines GTL1 through GTL8 may correspond to dummy wordlines. Each ground selection transistor GST may be connected to one of ground selection lines GSL1 through GSL3. Each string selection transistor SST may be connected to one of the bitlines BL1 through BL3, and each ground selection transistor GST may be connected to the common source line CSL.

Wordlines (e.g., a wordline GTL1) at the same height may be connected in common, and the ground selection lines GSL1 through GSL3 and the string selection lines SSL1 through SSL3 may be separated (e.g., electrically separated) from one another. FIG. 20 illustrates that the memory block BLKi is connected to eight gate lines and three bitlines, but the present disclosure is not limited thereto.

Figure 21:
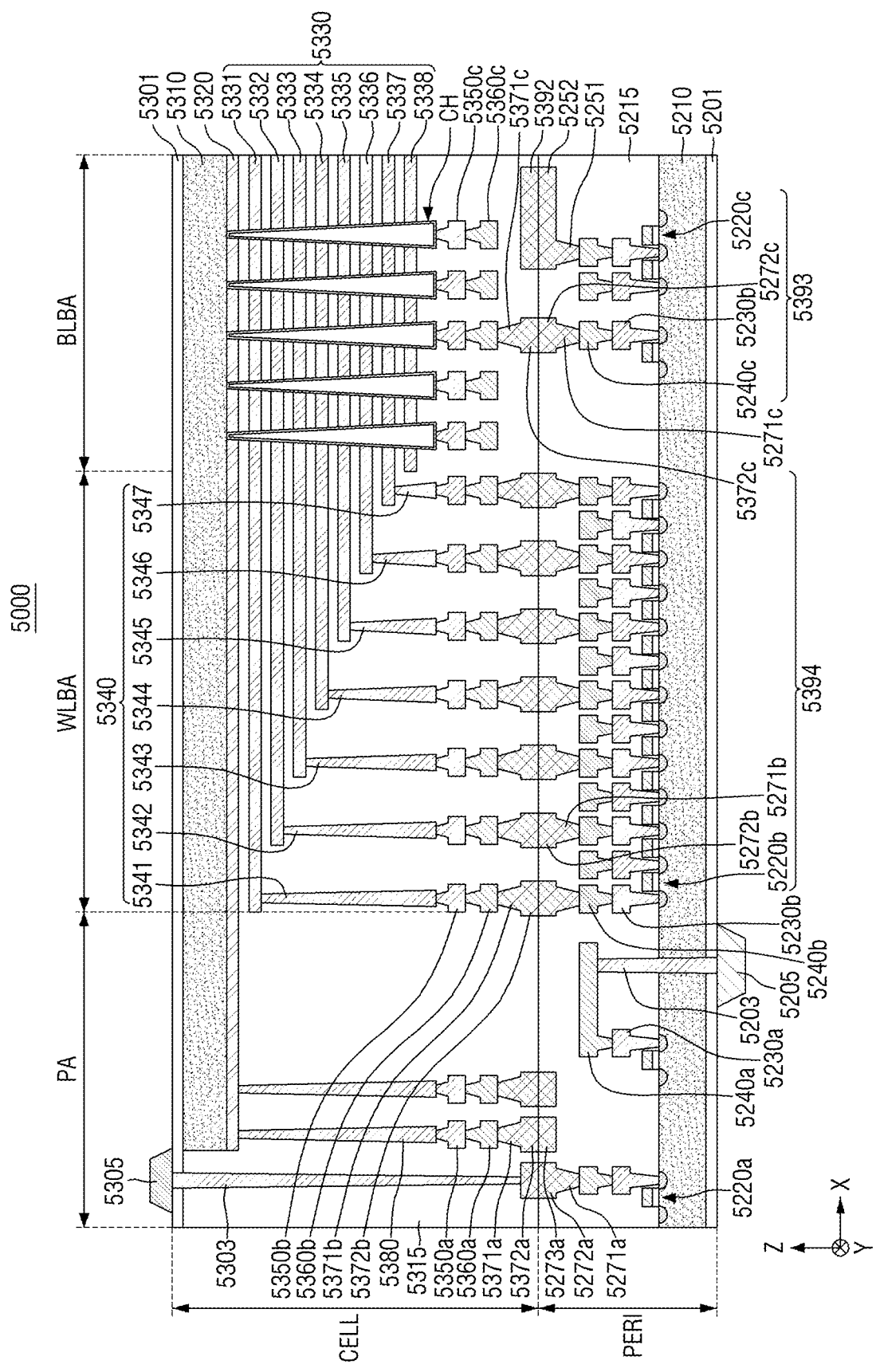
FIG. 21 is a cross-sectional view of a BVNAND structure that can be applied to a UFS device according to some embodiments of the present disclosure.

FIG. 21 is a cross-sectional view of a BVNAND (bonded VNAND) structure that can be applied to a UFS device according to some embodiments of the present disclosure.

Referring to FIG. 21, a memory device 5000 may have a chip-to-chip (C2C) structure. The memory device 5000 having the C2C structure may be obtained by forming an upper chip including a cell region CELL on a first wafer, forming a lower chip including a peripheral circuit region PERI on a second wafer, which is different from the first wafer, and connecting the upper and lower chips via bonding. For example, the upper and lower chips may be connected by electrically connecting bonding metals formed in the uppermost metal layer of the upper chip and bonding metals formed in the uppermost metal layer of the lower chip. For example, in a case where the bonding metals are formed of copper (Cu), the upper and lower chips may be connected via Cu—Cu bonding. Alternatively, the bonding metals may be formed of aluminum (Al) or tungsten (W).

Each of the peripheral circuit region PERI and the cell region CELL of the memory device 5000 may include an external pad bonding area PA, a wordline bonding area WLBA and a bitline bonding area BLBA.

The peripheral circuit region PERI may include a first substrate 5210, an interlayer insulating layer 5215, a plurality of circuit elements (5220a through 5220c), which are formed on the first substrate 5210, first metal layers (5230a through 5230c), which are connected to the circuit elements (5220a through 5220c), respectively, and second metal layers (5240a through 5240c), which are formed on the first metal layers (5230a through 5230c), respectively. For example, the first metal layers (5230a through 5230c) may be formed of W having a relatively high resistance, and the second metal layers (5240a through 5240c) may be formed of Cu having a relatively low resistance.

FIG. 21 illustrates only two types of metal layers, i.e., the first metal layers (5230a through 5230c) and the second metal layers (5240a through 5240c), but the present disclosure is not limited thereto. Alternatively, at least one metal layer may be further formed on each of the second metal layers (5240a through 5240c) and may include Al having a lower resistance than the material of the second metal layers (5240a through 5240c), i.e., Cu.

The interlayer insulating layer 5215 may be disposed on the first substrate 5210 to cover the circuit elements (5220a through 5220c), the first metal layers (5230a through 5230c) and the second metal layers (5240a through 5240c) and may include an insulating material such as silicon oxide or silicon nitride.

Lower bonding metals (5271b and 5272b) may be formed on the second metal layer 5240b, in the wordline bonding area WLBA. In the wordline bonding area WLBA, lower bonding metals (5271b and 5272b) of the peripheral circuit region PERI may be electrically connected to lower bonding metals (5271b and 5272b) of the cell region CELL via bonding. The lower bonding metals (5271b and 5272b) and upper bonding metals (5371b and 5372b) may be formed of Al, Cu or W.

The cell region CELL may provide at least one memory block. The cell region CELL may include a second substrate 5310 and a common source line 5320. A plurality of wordlines 5330 (or 5331 through 5338) may be stacked in a third direction (or a Z-axis direction) perpendicular to the top surface of the second substrate 5310. String selection lines and ground selection lines may be disposed above and below the wordlines 5330, and the wordlines 5330 may be disposed between the string selection lines and the ground selection lines.

In the bitline bonding area BLBA, channel structures CH may extend in the third direction to penetrate the string selection lines and the ground selection lines. The channel structures CH may include data storage layers, channel layers and buried insulating layers, and the channel layers may be electrically connected to first metal layers 5350c and second metal layers 5360c. For example, the first metal layers 5350c may be bitline contacts, and the second metal layers 5360c may be bitlines. For example, the bitlines 5360c may extend in a first direction (or a Y-axis direction) parallel to the top surface of the second substrate 5310.

In the embodiment of FIG. 21, an area where the channel structures CH and the bitlines 5360c are disposed may be defined as the bonding area BLBA. The bitlines 5360c may be electrically connected to circuit elements 5220c, which provide a page buffer unit 550 in the peripheral circuit region PERI, in the bonding area BLBA. For example, the bitlines 5360c may be connected to the upper bonding metals (5371c and 5372c), in the peripheral circuit region PERI, and the upper bonding metals (5371c and 5372c) may be connected to the lower bonding metals (5271c and 5272c), which are connected to the circuit elements 5220c of the page buffer unit 550.

In the wordline bonding area WLBA, the wordlines 5330 may extend in a second direction (or an X-axis direction) parallel to the top surface of the second substrate 5310 and may be connected to a plurality of cell contact plugs 5340 (or 5341 through 5347). The wordlines 5330 and the cell contact plugs 5340 may be connected by pads that are provided due to at least some of the wordlines 5330 extending in different lengths in the second direction. First metal layers 5350b and second metal layers 5360b may be sequentially connected above the cell contact plugs 5340, which are connected to the wordlines 5330. The cell contact plugs 5340 may be connected to the peripheral circuit region PERI via the upper bonding metals (5371b and 5372b) of the cell region CELL and the lower bonding metals (5271b and 5272b) of the peripheral circuit region PERI.

The cell contact plugs 5340 may be electrically connected to circuit elements 5220b, which provide a row decoder 540 in the peripheral circuit region PERI. The operating voltage of the circuit elements 5220b, which provide the row decoder 540, may differ from the operating voltage of the circuit elements 5220c, which provide the page buffer unit 550. For example, the operating voltage of the circuit elements 5220b, which provide the row decoder 540, may be higher than the operating voltage of the circuit elements 5220c, which provide the page buffer unit 550.

Common source line contact plugs 5380 may be disposed in the external pad bonding area PA. The common source line contact plugs 5380 may be formed of a conductive material such as a metal, a metal compound or polysilicon and may be electrically connected to the common source line 5230. The first metal layers 5350a and the second metal layers 5360a may be sequentially stacked on the common source line contact plugs 5380. For example, an area where the common source line contact plugs 5380, the first metal layers 5350a and the second metal layers 5360a are disposed may be defined as the external pad bonding area PA.

First and second input/output pads 5205 and 5305 may be disposed in the external pad bonding area PA. Referring to FIG. 21, a lower insulating film 5201 may be formed below the first substrate 5210 to cover the bottom surface of the first substrate 5210, and the first input/output pad 5205 may be formed on the lower insulating film 5201. The first input/output pad 5205 may be connected to at least one of the circuit elements (5220a through 5220c), which are disposed in the peripheral circuit region PERI, and may be separated from the first substrate 5210 by the lower insulating film 5201. A side insulating film (not illustrated?) may be disposed between a first input/out contact plug 5203 and the first substrate 5210 to electrically separate the first input/output contact plug 5203 and the first substrate 5210.

An upper insulating film 5301 may be formed on the second substrate 5310 to cover the top surface of the second substrate 5301, and the second input/output pad 5305 may be disposed on the upper insulating film 5301. The second input/output pad 5305 may be connected to at least one of the circuit elements (5220a through 5220c), which are disposed in the peripheral circuit region PERI, via a second input/output contact plug 5303.

The second substrate 5310 and the common source line 5320 may not be disposed in a region where the second input/output contact plug 5303 is disposed. The second input/output pad 5305 may not overlap with the wordlines 5330 in the third direction (or the Z-axis direction). The second input/output contact plug 5303 may be separated from the second substrate 5310 in the third direction (or the Z-axis direction) and may be connected to the second input/output pad 5305 through an interlayer insulating layer 5315 of the cell region CELL.

The first and second input/output pads 5205 and 5305 may be selectively formed. For example, the memory device 5000 may include only the first input/output pad 5205 on the first substrate 5201 or only the second input/output pad 5305 on the second substrate 5301. In another example, the memory device 5000 may include both the first and second input/output pads 5205 and 5305.

In the external pad bonding area PA and the bonding area BLBA of each of the cell region CELL and the peripheral circuit region PERI, metal patterns of uppermost metal layers may exist as dummy patterns, or the uppermost metal layers may be empty.

In the external pad bonding area PA, a lower metal pattern 5273a, which has the same shape as an upper metal pattern 5372a in the uppermost metal layer of the cell region CELL, may be formed in the uppermost metal layer of the peripheral circuit region PERI to correspond to the upper metal pattern 5372a. The lower metal pattern 5273a in the uppermost metal layer of the peripheral circuit region PERI may not be connected to any particular contact in the peripheral circuit region PERI. Similarly, in the external pad bonding area PA, an upper metal pattern, which has the same shape as a lower metal pattern in the uppermost metal layer of the peripheral circuit region PERI, may be formed in the uppermost metal layer of the cell region CELL to correspond to the lower metal pattern in the uppermost metal layer of the peripheral circuit region PERI.

The lower bonding metals (5271b and 5272b) may be formed on the second metal layers 5240b in the wordline bonding area WLBA. In the wordline bonding area WLBA, the lower bonding metals (5271b and 5272b) of the peripheral circuit region PERI may be electrically connected to the upper bonding metals (5371b and 5372b) of the cell region CELL via bonding.

In the bitline bonding area BLBA, an upper metal pattern 5392, which has the same shape as a lower metal pattern 5252 in the uppermost metal layer of the peripheral circuit region PERI, may be formed in the uppermost metal layer of the cell region CELL. No contact may be formed on the upper metal pattern 5392, which is formed in the uppermost metal layer of the cell region CELL. A similar method such as described in the above embodiments may be used to control the link attributes of the Tx and Rx path between a storage controller (e.g., 2210 as described in the various embodiments above) and the memory device 5000 of FIG. 21.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A storage system comprising:
    a storage device including a plurality of nonvolatile memories, the storage device configured to output transmission and reception information reflecting storage throughput information;
    a resource management intellectual property (IP) in the storage device, the resource management IP configured to collect the storage throughput information and, based on the storage throughput information, determine the transmission and reception information to output; and
    a host device configured to receive the transmission and reception information output by the storage device, and change connection configurations for the storage device based on the received transmission and reception information,
    wherein the host device changes the connection configurations by changing configurations for a transmitter path and a receiver path between the storage device and the host device, such that a configuration for the transmitter path and a configuration for the receiver path are changed independently to be different from each other.

2. The storage system of claim 1, wherein the storage throughput information includes at least one of a read delay, a write delay, an input/output speed, a type of memory cells, a density of memory cells, operation attributes, internal buffer size, a channel quantity, a type of control units, a number of control units, and internal module operating frequency.

3. The storage system of claim 1, wherein the storage device includes a descriptor storage, configured to store a plurality of descriptors corresponding to a plurality of return values for operations between the storage device and the host device, and wherein theft resource management IP is configured to output a resource descriptor including one of the return values corresponding to the storage throughput information and the transmission and reception information.

4. The storage system of claim 3, wherein the host device is configured to receive the resource descriptor and change the connection configurations based on the return value included in the resource descriptor.

5. The storage system of claim 1, wherein the host device is configured to change the connection configurations by setting a first connection speed for the transmitter path and setting a second connection speed, which is different from the first connection speed, for the receiver path.

6. An operating method of a Universal Flash Storage (UFS) system including a Universal Flash Storage host and a Universal Flash Storage device, comprising:
    completing setting of M-PHY link configurations between the UFS host and the UFS device;
    sending, by the UFS host, a query request to read a descriptor;
    outputting, by the UFS device, a query response corresponding to the query request, the query response including a resource descriptor that includes a return value for the M-PHY link configurations;

resetting, by the UFS host, link attributes for the Universal Flash Storage device based on the return value of the resource descriptor;

sending, by the UFS host, a link attribute change request corresponding to the reset link attributes to the UFS device; and changing, by the UFS device, the link attributes in response to the link attribute change request and sending, by the UFS device, a link attribute change response.

7. The operating method of claim 6, wherein the resetting the link attributes, comprises setting transmitter and receiver speeds, among the M-PHY link configurations, between the UFS host and the UFS device asymmetrically.

8. The operating method of claim 6, wherein one of a plurality of return values is selected based on storage throughput information of the UFS device and is included in the query response.

9. The operating method of claim 8, wherein the storage throughput information includes at least one of a read delay, a write delay, an input/output speed, a type of memory cells, a density of memory cells, operation attributes, internal buffer size, a channel quantity, a type of control units, a number of control units, and internal module operating frequency.

10. The operating method of claim 6, wherein the resetting the link attributes, comprises setting first and second clock speeds of transmitter and receiver path domains, among the M-PHY link configurations, independently.

11. A storage controller connected between a host device and a plurality of nonvolatile memories, the storage controller comprising:
 a resource management intellectual property (IP) configured to send a query response including a resource descriptor in response to a query request being received from the host device, wherein the resource descriptor includes a return value selected based on storage throughput information regarding the plurality of nonvolatile memories;
 wherein:
 the storage controller is configured to be connected to the host device in accordance with link attributes that are reset based on the resource descriptor, and
 the link attributes are reset by setting connections of transmitter (Tx) and receiver (Rx) path domains independently to have different connection speeds from each other.

12. The storage controller of claim 11, wherein the storage throughput information includes at least one of a read delay, a write delay, an input/output speed, a type of memory cells, a density of memory cells, operation attributes, internal buffer size, a channel quantity, a type of control units, a number of control units, and internal module operating frequency, for at least one of the plurality of nonvolatile memories.

13. The storage controller of claim 11, further comprising:
 a plurality of logic units connected to the plurality of nonvolatile memories, respectively;
 a descriptor storage storing a plurality of descriptors corresponding to a plurality of configuration values for operations between the host device and the storage controller; and
 a device level manager configured to control operations of the logic units.

14. The storage controller of claim 13, wherein
 the resource management intellectual property is configured to collect storage throughput information regarding the plurality of nonvolatile memories and transmit the storage throughput information to the descriptor storage, and
 the descriptor storage is configured to return a return value corresponding to the storage throughput information to the resource management IP.

15. The storage controller of claim 11, wherein the link attributes are reset by changing transmitter and receiver power modes between the host device and the storage controller asymmetrically in accordance with the resource descriptor.

16. The storage controller of claim 15, wherein each of the transmitter and receiver power modes is at least one of a lane quantity, gear speed, and "HSSeries" between the host device and the storage controller.

17. A storage controller connected between a host device and a plurality of nonvolatile memories, comprising:
 a Universal Flash Storage (UFS) interconnect (UIC) input/output interface connected to the host device to transmit and receive a pair of differential input signals and a pair of differential output signals; and
 a resource management intellectual property (IP) configured to control transmitter and receiver path domains for the differential input signals and the differential output signals based on storage throughput information,
 wherein the resource management IP is configured to set the transmitter and receiver path domains independently to be different from each other.

18. The storage controller of claim 17, wherein the transmitter and receiver path domains are set based on a resource descriptor retrieved from storage of the UFS by the resource management IP and transmitted from the resource management IP to the host device.

19. An operating method of a storage controller, comprising:
 connecting the storage controller to a host device in accordance with initial link configurations;
 receiving a query request to read a descriptor from the host device;
 sending a query response including a geometry descriptor to the host device based on the query request;
 receiving a power mode change request that is based on the query request, from the host device; and
 resetting transmitter and receiver paths between the storage controller and the host device in response to the power mode change request,
 wherein the transmitter and receiver paths are reset asymmetrically in connection with transmission of data between the storage controller and the host device.

\* \* \* \* \*